(12) United States Patent
Park et al.

(10) Patent No.: US 8,611,610 B2
(45) Date of Patent: Dec. 17, 2013

(54) METHOD AND APPARATUS FOR CALCULATING A DISTANCE BETWEEN AN OPTICAL APPARATUS AND AN OBJECT

(75) Inventors: Yong-hwa Park, Yongin-si (KR); Jang-woo You, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 489 days.

(21) Appl. No.: 12/837,814

(22) Filed: Jul. 16, 2010

(65) Prior Publication Data

US 2011/0176709 A1 Jul. 21, 2011

(30) Foreign Application Priority Data

Jan. 21, 2010 (KR) ........................ 10-2010-0005753

(51) Int. Cl.
G06K 9/00 (2006.01)
H01J 40/14 (2006.01)
H01L 31/00 (2006.01)

(52) U.S. Cl.
USPC ..................... 382/106; 250/214 R; 250/214.1

(58) Field of Classification Search
USPC ............ 382/106; 250/214 R, 214.1; 315/152, 315/157, 158
See application file for complete search history.

(56) References Cited

U.S. PATENT DOCUMENTS

| | | | |
|---|---|---|---|
| 4,935,616 A | 6/1990 | Scott | |
| 4,988,859 A * | 1/1991 | Tsuchiya et al. | ........ 250/214 VT |
| 5,081,530 A | 1/1992 | Medina | |
| 5,497,202 A * | 3/1996 | Kim | .............................. 348/536 |
| 6,057,909 A | 5/2000 | Yahav et al. | |
| 6,088,086 A | 7/2000 | Muguira et al. | |
| 6,100,517 A | 8/2000 | Yahav et al. | |
| 6,118,946 A | 9/2000 | Ray et al. | |
| 6,331,911 B1 | 12/2001 | Manassen et al. | |
| 6,794,628 B2 | 9/2004 | Yahav et al. | |
| 6,856,355 B1 | 2/2005 | Ray et al. | |
| 6,881,986 B1 * | 4/2005 | Chiou et al. | ................... 257/184 |
| 7,095,487 B2 | 8/2006 | Gonzalez-Banos et al. | |

(Continued)

FOREIGN PATENT DOCUMENTS

| | | |
|---|---|---|
| JP | 2005-309019 A | 11/2005 |
| JP | 2007-078821 A | 3/2007 |
| KR | 10-2007-0047235 A | 5/2007 |

(Continued)

*Primary Examiner* — Amara Abdi
(74) *Attorney, Agent, or Firm* — Sughrue Mion, PLLC

(57) ABSTRACT

A method and apparatus for determining a distance between an optical apparatus and an object by considering a measured nonlinear waveform, as opposed to a mathematically ideal waveform. The method and apparatus may accurately calculate distance information without being affected by a type of waveform projected onto the object and may not require an expensive light source or a light modulator for generating a light with little distortion and nonlinearity. Further, since the method may be able to use a general light source, a general light modulator, and a general optical apparatus, additional costs do not arise. Furthermore, a lookup table, in which previously calculated distance information is stored, may be used, and thus the amount of computation required to be performed to calculate the distance is small, thereby allowing for quick calculation of the distance information in real time.

39 Claims, 18 Drawing Sheets

(56) References Cited

U.S. PATENT DOCUMENTS

| | | |
|---|---|---|
| 7,230,685 B2 | 6/2007 | Suzuki et al. |
| 2007/0057198 A1* | 3/2007 | Wilson et al. ............... 250/458.1 |
| 2008/0297730 A1* | 12/2008 | Park et al. ........................ 353/31 |
| 2009/0060273 A1* | 3/2009 | Stephan et al. ................ 382/103 |
| 2009/0079959 A1* | 3/2009 | Masuda ........................... 356/5.1 |
| 2009/0086188 A1* | 4/2009 | Onojima ...................... 356/4.01 |
| 2009/0244536 A1* | 10/2009 | Mitchell et al. ................ 356/343 |
| 2010/0163889 A1 | 7/2010 | Park et al. |
| 2010/0177372 A1 | 7/2010 | Park et al. |
| 2010/0182671 A1 | 7/2010 | Park |

FOREIGN PATENT DOCUMENTS

| | | |
|---|---|---|
| KR | 10-2008-0039473 A | 5/2008 |
| KR | 10-2010-0080092 A | 7/2010 |
| KR | 10-2010-0084018 A | 7/2010 |
| KR | 10-2010-0084842 A | 7/2010 |
| KR | 1020100130782 A | 12/2010 |
| KR | 1020100135548 A | 12/2010 |
| KR | 1020100138147 A | 12/2010 |

* cited by examiner

METHOD AND APPARATUS FOR CALCULATING A DISTANCE BETWEEN AN OPTICAL APPARATUS AND AN OBJECT

CROSS-REFERENCE TO RELATED APPLICATIONS

This application claims priority from Korean Patent Application No. 10-2010-0005753, filed on Jan. 21, 2010, in the Korean Intellectual Property Office, the disclosure of which is incorporated herein by reference in its entirety.

BACKGROUND

1. Field

The present disclosure relates to methods of extracting distance information and optical apparatuses using the methods, and more particularly, to methods of extracting distance information about a distance between an object and an optical apparatus by using an actual nonlinear waveform, as opposed to an ideal waveform, and optical apparatuses using the methods.

2. Description of the Related Art

Research on three-dimensional (3D) cameras or laser radars (LADARs) for obtaining distance information about a distance between an object and an optical apparatus has recently increased. In general, distance information about a distance between an object and an optical apparatus may be obtained by using a stereo vision method that uses two cameras or a triangulation method that uses structured light and a camera. However, the stereo vision method and the triangulation method have disadvantages, in that the accuracy of distance information drastically decreases as a distance between an object and an optical apparatus increases. Further, it is difficult to obtain precise distance information because both methods are dependent on the state of a surface of the object.

In order to overcome the disadvantages of the stereo vision method and the triangulation method, a time-of-flight (TOF) method has been suggested. The TOF method involves emitting a laser beam to an object and measuring a time taken for light reflected from the object to be received by a receiving unit. In more detail, the TOF method involves projecting light having a specific wavelength, for example, light having a near infrared (NIR) wavelength of 850 nm, to an object by using a light-emitting diode (LED) or a laser diode (LD), receiving part of the light having the wavelength of 850 nm reflected from the object by using a receiving unit, and processing the received light by using the receiving unit to generate distance information. The TOF method may be performed in various methods according to a process of processing light.

For example, the TOF method using a shuttered light pulse (SLP) modulates an image reflected from an object by using an image intensifier or a solid-state modulation device, captures the modulated image by using an image sensor, and obtains distance information from an intensity value of the captured modulated image. The TOF method using the SLP requires a very high light modulation rate of tens to hundreds of MHz to determine a phase shift of light according to distance and a light travel time. To this end, for example, the TOF method using the SLP uses an image intensifier that includes a multi-channel plate (MCP) or a GaAs-based solid-state modulation device. In recent years, an improved GaAs-based modulation device and a thin film modulation device using an electro-optic material have been developed.

Examples of the process of processing light for distance information extraction include a method of pulse-driving a light source and a light modulation device, a method using a special waveform, such as a triangular or ramp waveform, and a method using a sinusoidal waveform. Also, various methods of driving a light source and a light modulation device according to used waveforms have been developed, and various algorithms for extracting distance information from obtained intensity values have been developed.

The TOF method extracts distance information on the assumption that used waveforms, for example, a triangular waveform and a sinusoidal waveform, are ideal waveforms. However, actually, it may be difficult to have ideal waveforms due to nonlinearity and operation errors of the light source or the light modulation device. For example, an LED operates at a current greater than a threshold current, and output optical power has saturation and nonlinearity even during operation of the LED. Also, a gain of the light modulation device is nonlinear in many cases during operation of the light modulation device. In particular, if a high voltage or a high current is used, more nonlinearity or operation errors may occur according to a design of a driving circuit. Such operation errors directly affect distance information extraction, thereby causing an error. Accordingly, an expensive waveform generator that generates a very accurate ideal waveform, or a complex additional algorithm and a driving circuit for correcting the error, may be required.

SUMMARY

Provided are methods of calculating a distance between an object and an optical apparatus that uses an actual nonlinear waveform, and not a mathematically ideal waveform, to calculate the distance.

Provided are optical apparatuses for calculating the distance by using the method.

Additional aspects will be set forth in part in the description which follows and, in part, will be apparent from the description, or may be learned by practice of the presented exemplary embodiments.

According to an exemplary embodiment, a method of extracting distance information includes: projecting a plurality of different lights onto an object; modulating, by a light modulator having a gain, reflected lights reflected from the object into modulated images; detecting, by a photodetector, the modulated images and obtaining from the modulated images a plurality of intensity images respectively corresponding to the plurality of different lights; and calculating a distance to the object from the obtained phase delay, wherein the obtaining of the phase delay comprises referring to a lookup table that stores information obtained by measuring the waveforms of the plurality of different lights and the gain of the light modulator.

The waveforms of the plurality of different lights and the gain of the light modulator may have the same period.

The plurality of different lights may have one of the same waveform and different phases or different waveforms.

The plurality of different lights may be controlled to have the same average value.

The photodetector may form the plurality of intensity images respectively corresponding to the plurality of different lights by accumulating a plurality of modulated images, which respectively correspond to the plurality of different lights, respectively for predetermined exposure times.

The method may further include obtaining a reflectance of the object and an intensity of an ambient light from the phase delay.

The obtaining of the phase delay may include: quantizing an intensity image vector in a three-dimensional (3D) space by using the plurality of intensity images; obtaining a rotation angle of the intensity image vector from a reference vector in the 3D space; and obtaining from the rotation angle a phase delay of each of the reflected lights by referring to the lookup table.

The lookup table may include a previously determined relationship between the phase delay of each of the reflected lights and the rotation angle.

The intensity image vector may be quantized as a combination of differences between the plurality of intensity images.

The lookup table may comprise plural different lookup tables may corresponding to various combinations of the plurality of different lights and the gain, and the obtaining may comprise referring to a lookup table among the plural lookup tables corresponding to a specific combination of the plurality of different lights and the gain.

The lookup table may be created by: obtaining polynomial expressions representing the gain and the plurality of different lights by measuring waveforms of the plurality of different lights and the gain of the light modulator; obtaining polynomial expressions with respect to the plurality of intensity images by using the polynomial expressions with respect to the waveforms of the plurality of different lights and the gain of the light modulator; representing each of the polynomial expressions with respect to the plurality of intensity images as a sum of a function of the phase delay and a constant term that is not related to the phase delay; defining a vector function of the phase delay in a three-dimensional (3D) space by using a combination of differences between a plurality of functions of the phase delay, and defining a specific vector as a reference vector; defining an intensity image vector in the 3D space as a combination of differences between the polynomial expressions with respect to the plurality of intensity images; determining a relationship between a rotation angle of the intensity image vector from the reference vector and a phase delay corresponding to the rotation angle; and creating the lookup table including the determined relationship.

The obtaining of the polynomial expressions may include: inducing general polynomial expressions with respect to the reflected lights from the polynomial expressions with respect to the plurality of different lights; obtaining polynomial expressions with respect to the modulated images by multiplying the polynomial expressions with respect to the reflected lights by the polynomial expression with respect to the gain; and obtaining polynomial expressions with respect to the plurality of intensity images respectively corresponding to the plurality of different lights by integrating the polynomial expressions with respect to the modulated images with an exposure time of the photodetector.

The obtaining the polynomial expressions representing the gain and the plurality of different lights by measuring the waveforms of the plurality of different lights and the gain of the light modulator may include: measuring the waveform of each of the plurality of different lights; expressing a result of the measuring of the waveform of each of the plurality of different lights as an orthogonal function on a time axis; measuring the waveform of the gain of the light modulator; and expressing a result of the measuring of the waveform of the gain of the light modulator as an orthogonal function on the time axis.

The expressing of the result of the measuring of the waveform of each of the plurality of different lights as the orthogonal function on the time axis may include obtaining a polynomial expression with respect to each of the plurality of different lights by determining coefficients of sine terms and coefficients of cosine terms of a Fourier series or coefficients of a Chebyshev polynomial expression.

The expressing of the result of the measuring of the waveform of the gain of the light modulator as the orthogonal function on the time axis may include obtaining a polynomial expression with respect to the gain by determining coefficients of sine terms and coefficients of cosine terms of a Fourier series or coefficients of a Chebyshev polynomial expression.

The method may further include determining average values of the plurality of different lights and an average value of the gain from the results of the measuring of the waveform of each of the plurality of different lights and the waveform of the gain.

The representing may include representing each of the polynomial expressions with respect to the plurality of intensity images as the sum of the function of the phase delay and the constant term that is not related to the phase delay by considering only a direct current (DC) term present in each of the polynomial expressions with respect to the plurality of intensity images.

The vector function of the phase delay in the 3D space may be defined by $$\vec{F}(\phi_{TOF}) = [F^{(12)}(\phi_{TOF}), F^{(23)}(\phi_{TOF}), F^{(31)}(\phi_{TOF})]^T$$

where $F^{(ij)}(\phi_{TOF}) = F^{(i)}(\phi_{TOF}) - F^{(j)}(\phi_{TOF})$, i,j=1, 2, 3, and $F^{(i)}(\Phi_{TOF})$ is a function of a phase delay of an $i^{th}$ projected light.

A vector $\vec{F}(0°)$ having a phase delay $\Phi_{TOF}=0$ in the vector function of the phase delay may be defined as a reference vector.

The intensity image vector in the 3D space may be defined by $$\vec{I}_{CCD} = [I_{CCD}^{(12)}, I_{CCD}^{(23)}, I_{CCD}^{(31)}]^T$$

where $I_{CCD}^{(ij)} = I_{CCD}^{(i)} - I_{CCD}^{(j)}$, i,j=1, 2, 3, and $I^{(i)}_{CCD}$ is an intensity image corresponding to an $i^{th}$ projected light.

Different lookup tables may be created according to various combinations of the plurality of different lights and the gain.

According to another exemplary embodiment, a method of extracting distance information includes: projecting light having a periodic waveform onto an object; modulating, by a light modulator having a plurality of different gains, a light reflected from the object into modulated images; detecting, by a photodetector, the modulated images to obtain a plurality of intensity images respectively corresponding to the plurality of different gains; obtaining a phase delay of the reflected light by using the plurality of intensity images; and calculating a distance to the object from the obtained phase delay, wherein the obtaining of the phase delay comprises obtaining the phase delay by referring to a lookup table having information obtained by measuring waveforms of the projected light and the plurality of different gains of the light modulator.

According to another exemplary embodiment, that determines a distance between the optical apparatus and an object may include: a light source that generates a plurality of different lights and projects the plurality of different lights onto the object, each of the plurality of different lights having a periodic waveform; a light modulator having a gain that modulates reflected lights reflected from the object into modulated images, each of the modulated images having a periodic waveform; a photodetector that detects the modulated images obtained by the light modulator and obtains, from the modulated images, a plurality of intensity images respectively corresponding to the plurality of different lights;

and a distance information image processor obtains a phase delay of each of the reflected lights from the plurality of intensity images, and calculates the distance between the optical apparatus and the object by referring to a lookup table that stores information obtained by measuring the waveforms of the plurality of different lights and the gain of the light modulator.

The optical apparatus may further include: a light source driving unit that controls waveforms of the plurality of different lights by driving the light source; a light modulator driving unit that controls a waveform of a gain by driving the light modulator; and a control unit that controls operations of the light source driving unit, the light modulator driving unit, and the photodetector.

The optical apparatus may further include: a first lens, disposed near a light incident surface of the light modulator, that focuses the reflected lights within an area of the light modulator; a filter, disposed between the first lens and the light modulator, that transmits only lights having specific wavelengths; and a second lens, disposed between the light modulator and the photodetector, that focuses the modulated images obtained by the light modulator within an area of the photodetector.

The photodetector may be a charge-coupled diode (CCD) image sensor or a complementary metal-oxide semiconductor (CMOS) image sensor including a two-dimensional (2D) or one-dimensional (1D) array, a photodetector including an array of photodiodes, or a photodetector including one photodiode for measuring a distance to a single point.

According to another exemplary embodiment, a 3D camera or a laser radar may include the optical apparatus.

According to another exemplary embodiment, a method of creating a lookup table for calculating distance information between an optical apparatus and an object may include: measuring waveforms light projected onto the object and a plurality of different gains of a light modulator; obtaining polynomial expressions representing the light and the plurality of different gains of the light modulator from the measured light and the plurality of different gains; obtaining polynomial expressions with respect to a plurality of intensity images from the polynomial expressions with respect to the light and the plurality of different gains of the light modulator; quantizing each of polynomial expressions with respect to the plurality of intensity images as a sum of a function of a phase delay and a constant term that is not related to the phase delay; defining a vector function of the phase delay in a three-dimensional (3D) space from a combination of differences of a plurality of functions of the phase delay, and defining a specific vector as a reference vector; defining an intensity image vector in the 3D space as a combination of differences between the polynomial expressions with respect to the plurality of intensity images; determining a relationship between a rotation angle of the intensity image vector from the reference vector and a phase delay corresponding to the rotation angle; and expressing the determined relationship in the form of a table or a function.

According to another exemplary embodiment, a computer-readable storage medium may store the lookup table created by the method.

BRIEF DESCRIPTION OF THE DRAWINGS

These and/or other aspects will become apparent and more readily appreciated from the following description of the exemplary embodiments, taken in conjunction with the accompanying drawings of which.

DETAILED DESCRIPTION

Figure 1:
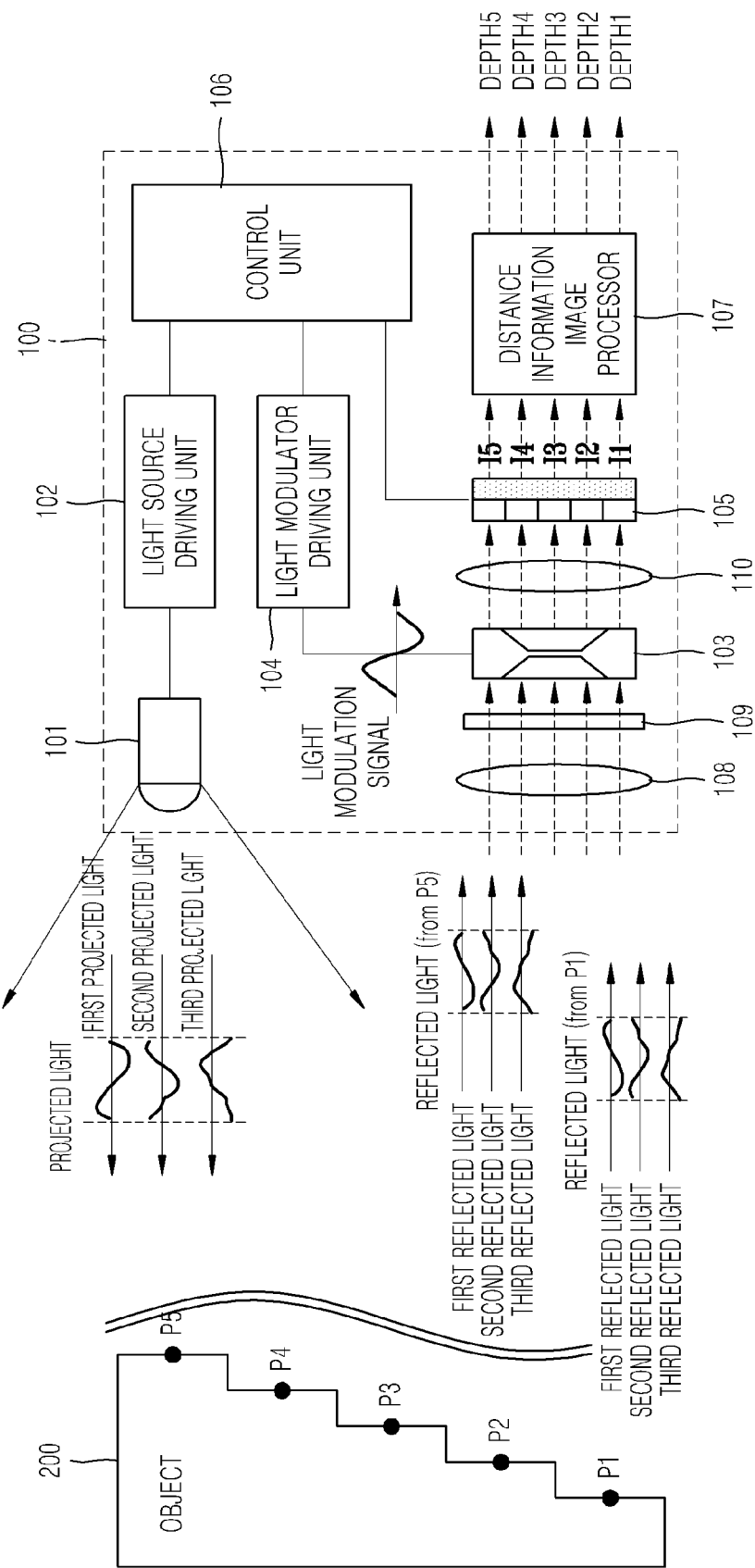
FIG. 1 is a block diagram of an optical apparatus for extracting distance information by using a time-of-flight (TOF) method.

Reference will now be made in detail to exemplary embodiments, examples of which are illustrated in the accompanying drawings, wherein like reference numerals refer to the like elements throughout and sizes of components may be exaggerated for clarity.

1. Structure and Operation of Optical Apparatus

FIG. 1 is a block diagram of an optical apparatus 100 for extracting distance information by using a time-of-light (TOF) method. Referring to FIG. 1, the optical apparatus 100 includes a light source 101 that generates a light having a predetermined wavelength, a light source driving unit 102 that drives the light source 101, a light modulator 103 that modulates a light reflected from an object 200, a light modulator driving unit 104 that drives the light modulator 103, a photodetector 105 that detects a modulated image obtained by the light modulator 103, a control unit 106 that controls operations of the components of the apparatus 100 including the light source driving unit 102, the light modulator driving unit 104, and the photodetector 105, and a distance information image processor 107 that calculates distance information based on an output of the photodetector 105. A first lens 108 that focuses the light reflected from the object 200 within an area of the light modulator 103 and a filter 109 that filters only a light having a specific wavelength may be disposed near a light incident surface of the light modulator 103. A second lens 110 that focuses the modulated image within an area of the photodetector 105 may be disposed between the light modulator 103 and the photodetector 105.

For example, the light source 101 may be a light-emitting diode (LED) or a laser diode (LD) that emits a light having a near infrared (NIR) wavelength of about 850 nm, which is not visible to the human eye for eye safety. However, the present exemplary embodiment is not limited to specific wavelength bands or specific types of light sources. For example, the light source driving unit 102 may drive the light source 101 by using an amplitude modulation method according to a control signal received from the control unit 106. Accordingly, a light projected to the object 200 from the light source 101 may be expressed as a periodic continuous function having a predetermined period "Te". For example, the projected light may have a defined waveform, such as a sinusoidal waveform, a ramp waveform, or a rectangular waveform, or a general waveform that is not defined.

As described above, general methods of extracting distance information assume that a light source outputs a projected light having an ideal waveform, such as a sinusoidal waveform, a ramp waveform, or a rectangular waveform. However, in fact, due to the nonlinearity of the light source and signal distortion, the light source does not output a light having an ideal waveform, even when the light having the ideal waveform is input as a driving signal, thereby causing an error in extracting accurate distance information.

Figure 2:
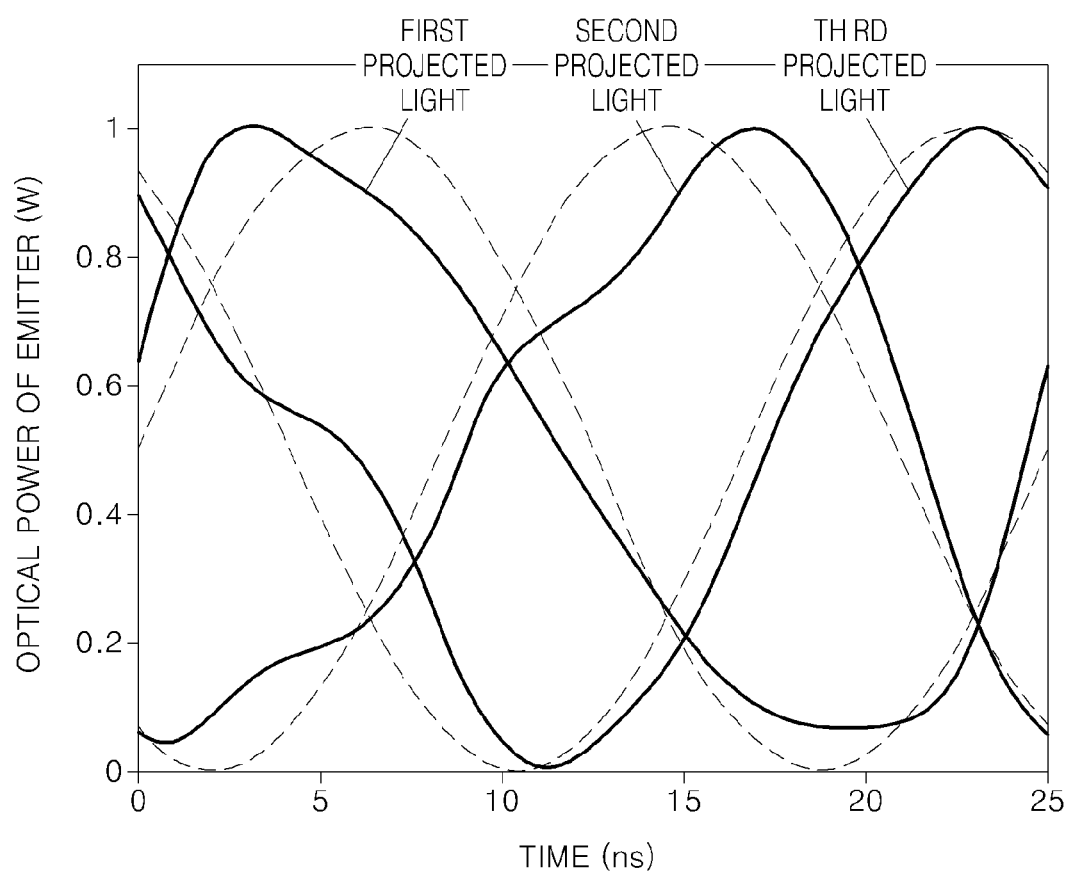
FIG. 2 is a graph illustrating output lights output from a light source and output lights having ideal sinusoidal waveforms.

FIG. 2 is a graph illustrating lights output from a light source and lights having ideal sinusoidal waveforms. In FIG. 2, a dashed line represents the lights having the ideal sinusoidal waveforms and a solid line represents the lights output from the light source. The lights output from the light source have distortion and direct current (DC)-offset, compared to the lights having the ideal sinusoidal waveforms, as illustrated in FIG. 2. Accordingly, to improve measurement precision, an expensive waveform generator or an expensive light source that generates a light having an ideal waveform may be required.

On the other hand, the optical apparatus 100 of FIG. 1 measures an actual output waveform and applies the measured output waveform to distance information calculation. Accordingly, since the optical apparatus 100 uses an output light with distortion and DC-offset, the optical apparatus 100 does not require an expensive waveform generator or an expensive light source. Also, the light source 101 of the optical apparatus 100 may output a projected light having a combination of a sinusoidal waveform, a ramp waveform, and a rectangular waveform, as well as a single waveform.

The light modulator 103 modulates the light reflected from the object 200 under the control of the light modulator driving unit 104. The light modulator driving unit 104 drives the light modulator 103 according to a control signal received from the control unit 106. For example, the light modulator 103 may vary a gain, according to a light modulation signal having a predetermined waveform provided by the light modulated driving unit 104, and may modulate an intensity of the reflected light. To this end, the light modulator 103 may act as a band pass filter having a variable gain. The light modulator 103 may operate at a high light modulation rate of tens to hundreds of MHz in order to determine a phase shift of light, according to distance and a light travel time. Examples of the light modulator 103 may include an image intensifier including a multi-channel plate (MCP), a GaAs-based solid-state modulation device, and a thin film modulation device using an electro-optic material. Although the light modulator 103 is of a transmission type in FIG. 1, the present exemplary embodiment is not limited thereto and a reflective light modulator may be used.

Figure 3:
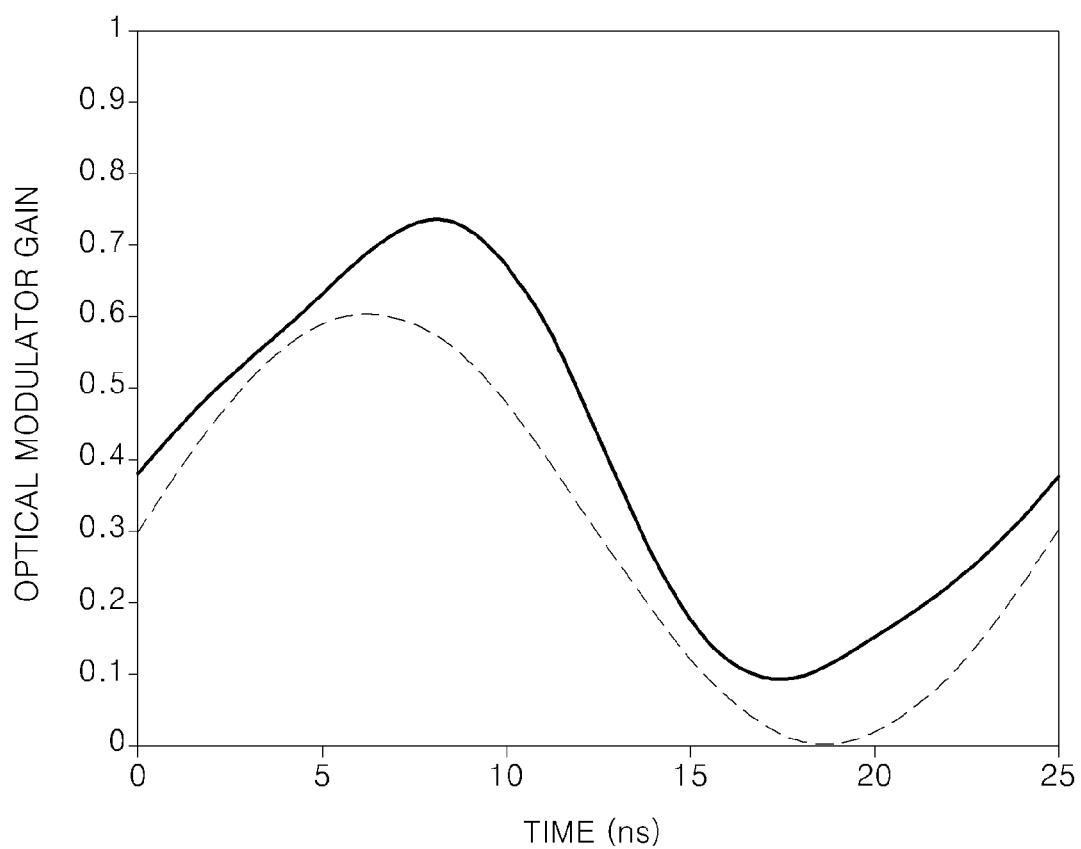
FIG. 3 is a graph illustrating a gain of a light modulator over time.

FIG. 3 is a graph illustrating a gain of the light modulator 103 over time. An operating frequency of the light modulator 103 is equal to an operating frequency "fe" of the light source 101. In FIG. 3, a dashed line represents an ideal gain of the light modulator 103, and a solid line represents an actual gain of the light modulator 103. Like the light source 101, the light modulator 103 has nonlinearity and DC-offset according to a structure thereof. Accordingly, as shown in FIG. 3, distortion is present in the actual gain of the light modulator 103, unlike the ideal gain of the light modulator 103. Since general methods of extracting distance information assume that a light modulator has an ideal gain, the nonlinearity and the DC-offset of the light modulator 103 causes an error. The optical apparatus 100 of FIG. 1, however, measures an actual gain of the light modulator 103 and applies the measured actual gain to distance information calculation. Accordingly, the optical apparatus 100 may use a general light modulator with distortion. Also, the gain of the light modulator 103 may have any of various waveforms, as well as a sinusoidal waveform.

The photodetector 105 detects the modulated image obtained by the light modulator 103 under the control of the control unit 106. If only a distance between the optical apparatus 100 and one point of the object 200 is to be measured, the photodetector 105 may use, for example, one light sensor, such as a photodiode or an integrator. However, if distances between the optical apparatus 100 and a plurality of points of the object 200 are to be measured, the photodetector 105 may use a two-dimensional (2D) or one-dimensional (1D) array of photodiodes, or any of other 1D or 2D photodetector arrays. For example, the photodetector 105 may be a charge-coupled diode (CCD) image sensor or a complementary metal-oxide semiconductor (CMOS) image sensor including a 2D or 1D array. In particular, if the photodetector 105 is such a CCD image sensor or CMOS image sensor, the optical apparatus 100 may be applied to a three-dimensional (3D) camera for capturing a 3D image having depth information.

The distance information image processor 107 calculates distance information according to a distance information extraction algorithm, which will be explained later, based on the output of the photodetector 105. The distance information image processor 107 may be an exclusive integrated circuit (IC), or a general computer such as a personal computer (PC).

The operation of the optical apparatus 100 will now be explained.

The light source 101 sequentially generates at least three different projected lights, each having a predetermined period "Te" and a predetermined waveform, at different times under the control of the control unit 106 and the light source driving unit 102. The at least three different projected lights are sequentially projected to the object 200. For example, if the at least three different projected lights are three different projected lights, that is, first through third projected lights, the light source 101 may generate and project the first projected light to the object 200 for a time T1, the second projected light to the object 200 for a time T2, and the third projected light to the object 200 for a time T3. The at least three different projected lights may be realized in various ways. For example, the at least three different projected lights may have the same waveform and different phases. However, for more accurate distance measurement, the at least three different projected lights may have different waveforms. Although the at least three different projected lights are not limited to specific waveforms, periods, and phases, all of the at least three different projected lights have waveforms with the same period.

Figure 4:
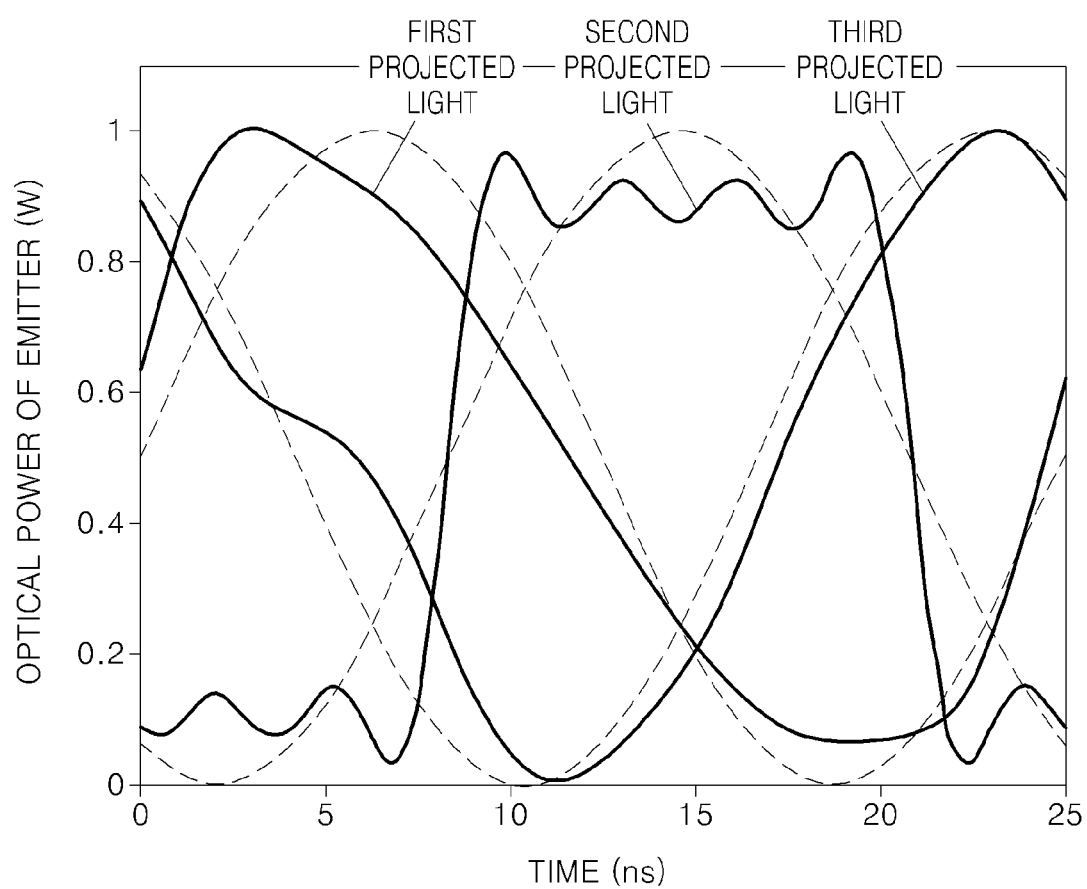
FIG. 4 is a graph illustrating three projected lights generated by a light source of the optical apparatus of FIG. 1.

FIG. 4 is a graph illustrating the first through third projected lights generated by the light source 101 of the optical apparatus 100 of FIG. 1. Referring to FIG. 4, the first projected light and the third projected light have waveforms similar to a linearly deformed triangular waveform and have different phases. The second projected light has a waveform similar to a distorted rectangular waveform. In FIG. 4, a dashed line represents an ideal triangular waveform. However, each of the first through third projected lights may have any of waveforms including a sinusoidal waveform, a triangular waveform, a rectangular waveform, a combination thereof, and a waveform with distortion. The first through third projected lights have different waveforms to measure an actual waveform of an output light and apply the measured waveform to distance information calculation, as will be described later with reference to a distance information extraction algorithm.

The first through third projected lights emitted from the light source 101 are reflected from surfaces of the object 200 and are incident on the first lens 108. In general, the object 200 may have a 2D array of surfaces with different distances, that is, depths, to the optical apparatus 100. For example, as illustrated in FIG. 1, the object 200 may have five surfaces P1 through P5, each having different distances to the optical apparatus 100. Each of the first through third projected lights is reflected from the surfaces P1 through P5 to generate five reflected lights with different phases. For example, five first reflected lights having different phases are generated when the first projected light is reflected from the five surfaces P1 through P5 of the object 200, five second reflected lights having different phases are generated when the second projected light is reflected from the five surfaces P1 through P5 of the object 200, and five third reflected lights having different phases are generated when the third projected light is reflected from the five surfaces P1 through P5 of the object 200. Because of the different distances between the surfaces P1 to P5 and the optical apparatus 100, for example, three reflected lights reflected from the surface P1, which is farthest from the optical apparatus 100, reach the first lens 107 after a time delay of TOF1, and three reflected lights reflected from the surface P5, which is closest to the optical apparatus 100, reach the first lens 108 after a time delay of TOF5 that is less than TOF1.

The first lens 108 focuses reflected lights within an area of the light modulator 103. The filter 109 that transmits only a light having a predetermined wavelength in order to remove a background light or a noisy light, other than the light having the predetermined wavelength, may be disposed between the first lens 108 and the light modulator 103. For example, if the light source 101 emits a light having a near infrared (NIR) wavelength of about 850 nm, the filter 109 may be a NIR band pass filter that passes a light having a NIR wavelength band of about 850 nm. Accordingly, lights emitted from the light source 101, and reflected from the object 200, may be mostly incident on the light modulator 103. Although the filter 109 is disposed between the first lens 108 and the light modulator 103 in FIG. 1, the present exemplary embodiment is not limited thereto, and for example, the first lens 108 may be disposed between the filter 109 and the light modulator 103.

The light modulator 103 modulates intensities of the reflected lights into modulated images, each having a predetermined wavelength. For example, the intensities of the reflected lights may be modulated by the light modulator 103 by being multiplied by the gain illustrated in FIG. 3. The waveform of the gain has a period that is equal to the period "Te" of each of the first through third projected lights. In FIG. 1, the light modulator 103 may modulate the five first reflected lights, respectively reflected from the five surfaces P1 through P5 of the object 200, and provide five first modulated images to the photodetector 105. Likewise, the light modulator 103 may sequentially modulate the five second reflected lights and the five third reflected lights and provide modulated second and third images to the photodetector 105, respectively.

The modulated images obtained by the light modulator 103 pass through the second lens 110, where magnifications of the modulated images are adjusted, and are refocused within an area of the photodetector 105 by the second lens 110. The photodetector 105 receives the modulated images for a predetermined exposure time and generates intensity images. For example, as shown in section (A) of FIG. 5, the photodetector 105 may receive modulated images corresponding to the five first reflected lights, respectively reflected from the five surfaces P1 through P5 of the object 200, for a predetermined exposure time, and generate a first intensity image IIM1. Next, as shown in section (B) of FIG. 5, the photodetector 105 may receive modulated images corresponding to the five second reflected lights, respectively reflected from the five surfaces P1 through P5 of the object 200, for a predetermined exposure time and generate a second intensity image IIM2. Next, as shown in section (C) of FIG. 5, the photodetector 105 may receive modulated images corresponding to the five third reflected lights, respectively reflected from the five surfaces P1 through P5 of the object 200, for a predetermined exposure time and generate a third intensity image IIM3. In this way, as shown in section (D) of FIG. 5, the three different intensity images IIM1, IIM2, and IIM3 may be obtained. Each of the first through third intensity images IIM1, IIM2, and IIM3 may have intensity information I1 through I5 corresponding to the five reflected lights respectively reflected from the five surfaces P1 through P5 of the object 200.

In order to obtain an image of one frame having distance information, at least three intensity images are necessary. Although the first through third intensity images IIM1, IIM2, and IIM3 are obtained by using the first through third projected lights in FIGS. 1 and 5, the present exemplary embodiment is not limited thereto and four or more intensity images may be obtained by using four or more projected lights. Each of the first through third intensity images IIM1, IIM2, and IIM3 may be a sub-frame used to obtain an image of one frame having distance information. If a period of one frame is "Td", an exposure time T of the photodetector 105 for obtaining each of the first through third intensity images IIM1, IIM2, and IIM3 may be approximately (⅓)×Td. However, exposure times for obtaining the first through third intensity images IIM1, IIM2, and IIM3 may not need to be the same and may be determined according to design requirements. For example, different exposure times T1, T2, and T3 may be assigned to the first through third intensity images IIM1, IIM2, and IIM3 as long as the exposure times T1, T2, and T3 satisfy a relationship of (T1+T2+T3)≤Td.

Figure 5:
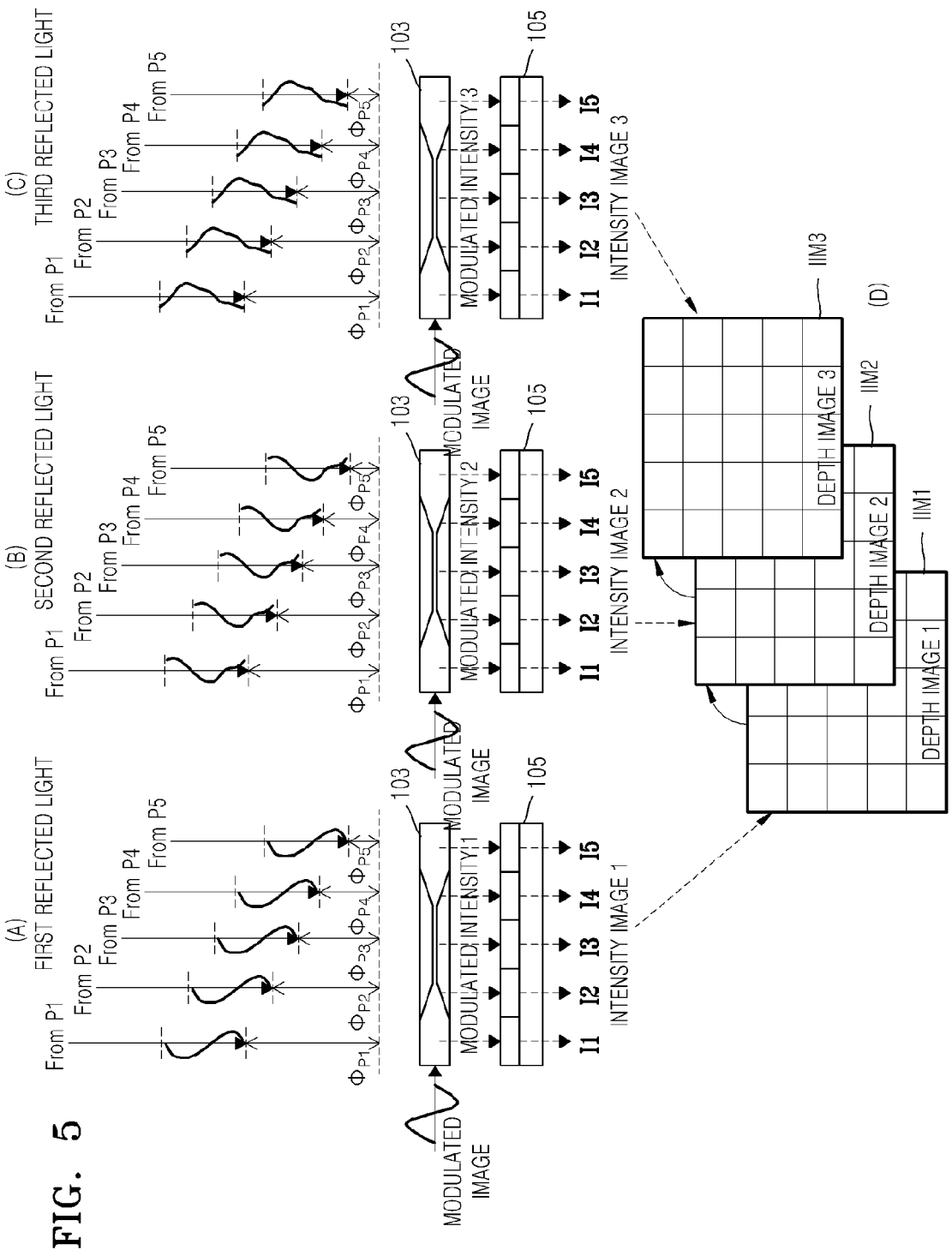
FIG. 5 illustrates a process of generating three different intensity images in a photodetector by reflecting and modulating the three projected lights, according to an exemplary embodiment.

Referring to FIG. 5 again, the first projected light emitted from the light source 101 is reflected from the five surfaces P1 through P5 of the object 200 to generate the five first reflected lights. The five first reflected lights are modulated by the light modulator 103 and reach the photodetector 105. In FIG. 5, the photodetector 105 includes five pixels respectively corresponding to the five surfaces P1 through P5 of the object 200 for simplicity of explanation. The five first reflected lights may be respectively incident on the five pixels. As shown in section (A) of FIG. 5, the five first reflected lights, respectively reflected from the five surfaces P1 through P5, have different phase delays $\Phi_{P1}$ through $\Phi_{P5}$ according to distances to the optical apparatus 100. For example, the light reflected from the surface P1, which is farthest from the optical apparatus 100, may have a greatest phase delay $\Phi_{P1}$. In a first sub-frame, for example, the photodetector 105 may capture the modulated images corresponding to the five first reflected lights for the exposure time T1, and generate the first intensity image IIM1.

A second sub-frame may be captured for the exposure time T2 after the first sub-frame is captured. Referring to section (B) of FIG. 5, the five second reflected lights of the second projected light are modulated by the light modulator 103 and reach the photodetector 105. The five second reflected lights, respectively reflected from the five surfaces P1 through P5, have phase delays $\Phi_{P1}$ through $\Phi_{P5}$, which are the same as those of the five first reflected lights. For example, the photodetector 105 may capture the modulated images corresponding to the five second reflected lights for the exposure time T2, and generate the second intensity image IIM2.

A third sub-frame may be captured for the exposure time T3 after the second sub-frame is captured. Referring to section (C) of FIG. 5, the five third reflected lights of the third projected light are modulated by the light modulator 103 and reach the photodetector 105. The five third reflected lights, respectively reflected from the five surfaces P1 through P5, have phase delays $\Phi_{P1}$ through $\Phi_{P5}$, which are the same as those of the five first reflected lights. For example, the photodetector 105 may capture the modulated images corresponding to the five third reflected lights modulated for the exposure time T3, and generate the third intensity image IIM3.

The first through third intensity images IIM1, IIM2, and IIM3, which are sequentially obtained, are transmitted to the distance information image processor 107. The distance information image processor 107 may generate an image having distance information according to a distance information extraction algorithm, which will be explained later, based on the first through third intensity images IIM1, IIM2, and IIM3.

Figure 6:
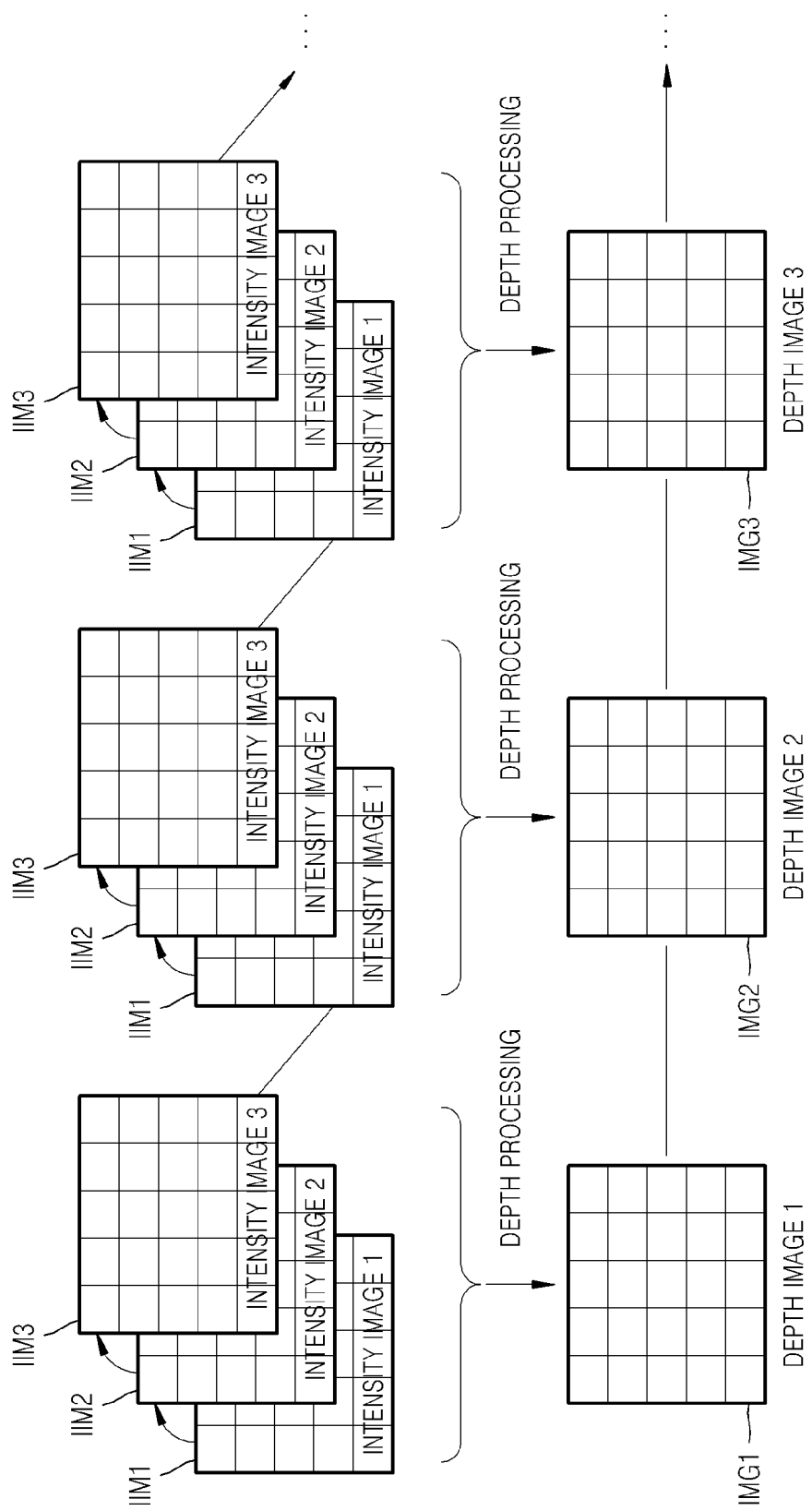
FIG. 6 illustrates a process of generating an image having distance information by using the three intensity images of FIG. 5, according to an exemplary embodiment.

FIG. 6 illustrates a process of generating an image having distance information from the first through third intensity images IIM1, IIM2, and IIM3 of FIG. 5, according to an exemplary embodiment. For example, a first distance information, image IMG1 may be obtained from the first through third intensity images IIM1, IIM2, and IIM3 generated in the first frame. Next, a second distance information image IMG2 may be obtained from the first through third intensity images IIM1, IIM2, and IIM3 generated in the second frame. A third distance information image IMG3 may be obtained from the first through third intensity images IIM1, IIM2, and IIM3 generated in the third frame. By repeating the aforesaid process, operations occurring between the optical apparatus 100 and a plurality of surfaces of the object 200 at a predetermined frame rate "fd" that is 1/Td may be observed in real time.

The first through third projected lights have been used to obtain the first through third intensity images IIM1, IIM2, and IIM3. However, in at least three sub-frames, the light source 101 may output one projected light having the same waveform and the light modulator 103 may have at least three different gains.

Figure 7:
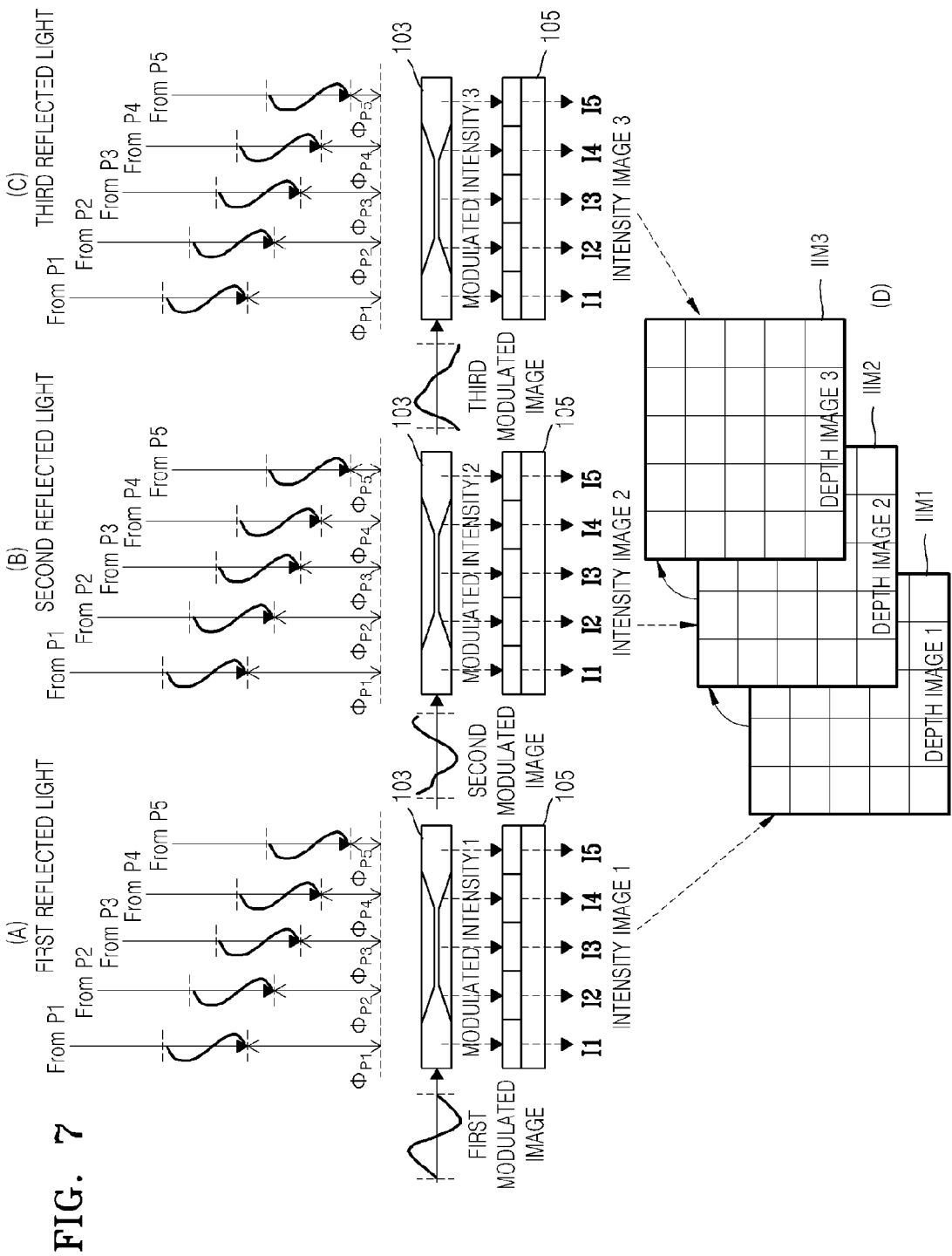
FIG. 7 illustrates a process of generating three different intensity images by using one projected light and three different gains, according to another exemplary embodiment.

FIG. 7 illustrates a process of generating the three different intensity images IIM1, IIM2, and IIM3 by using one projected light and three different gains, according to another exemplary embodiment. Referring to FIG. 7, reflected lights have the same waveform and the same phase, and have different phase delays $\Phi_{P1}$ through $\Phi_{P5}$ according to distances to the five surfaces P1 through P5 of the object 200. As shown in sections (A) through (C) of FIG. 7, in a first sub-frame, the light modulator 103 modulates the reflected lights into first modulated images, in a second sub-frame, the light modulator 103 modulates the reflected lights into second modulated images that are different from the first modulated images, and in a third sub-frame, the light modulator 103 modulates the reflected lights into third modulated images that are different from the first and second modulated images. Accordingly, as shown in section (D) of FIG. 7, the three different intensity images IIM1, IIM2, and IIM3 may be obtained. The first through third modulated images may have different phases or different waveforms. A process of generating a distance information image even in this case is the same as that described with reference to FIG. 6.

2. Distance Information Extraction Algorithm

A distance information extraction algorithm executed by the distance information image processor 107 to extract distance information, by using the first through third intensity images IIM1, IIM2, and IIM3, will now be explained.

The distance information extraction algorithm involves measuring a waveform of a projected light emitted from the light source 101 and a waveform of a gain of the light modulator 103 to establish a mathematical model by using a Fourier series, determining a theoretical relationship between a distance and an intensity image based on the mathematical model to create a lookup table, and comparing an actual intensity image with the lookup table to extract distance information in real time.

The following explanation will be made on a case where three projected lights and one gain of the light modulator are used, as shown in FIG. 5. Even when the output of the photodetector 105 is a 2D array of images, since a method of extracting distance information is the same for all pixels, explanation will be made on a case where the method of extracting distance information is applied to only one pixel. If distance information is simultaneously extracted from a plurality of pixels in a 2D array of images, the amount of computation may be reduced by efficiently performing data management and memory allocation to omit repeated operations.

2-1. Modeling of Waveforms of Projected Light and Reflected Light and Gain of Light Modulator Waveforms of general projected lights each having a period of "Te" may be represented as orthogonal functions on a time axis. For example, each of the waveforms of the general projected lights having the period of "Te" may be represented as a sine term and a cosine term of a Fourier series or a general polynomial expression, such as a Chebyshev polynomial expression. The following explanation will be made on a case where waveforms of projected lights are represented by using a Fourier series.

$$P_e^{(s)}(t) = \sum_{k=1}^{m} \{a_k^{(s)}\sin(k\omega t) + b_k^{(s)}\cos(k\omega t)\} + \overline{P}_{ave} \qquad \text{[Equation 1]}$$

where s is an identifier for identifying a waveform of a projected light, for example, if three projected lights are used, s=1, 2, or 3; ω is a driving angular frequency of the waveform of the projected light and has a relationship of ω=2πfe ("fe" is a driving frequency of the waveform of the projected light and fe=1/Te); $a_k^{(s)}$ is a coefficient of a sine term of the $k^{th}$ order in the projected light (s); $b_k^{(s)}$ is a coefficient of a cosine term of the $k^{th}$ order in the projected light (s). The coefficients $a_k^{(s)}$ and $b_k^{(s)}$ may be obtained by directly measuring optical power of the light source 101. For example, the coefficients $a_k^{(s)}$ and $b_k^{(s)}$ may be obtained by measuring the waveform of the projected light (s) emitted from the light source 101, and recognizing a frequency component by performing Fourier transformation, such as fast Fourier transformation (FFT), on the measured waveform. The order number "m" is sufficiently high to appropriately express measurement values of projected lights output from the light source 101. Average values of the projected lights output from the light source 101 are defined by Equation 2.

$$\overline{P}_{ave} = \frac{1}{T}\int_0^T P_e^{(s)}(t)\,dt \qquad \text{[Equation 2]}$$

where T is an exposure time of the photodetector 105 for obtaining one intensity image corresponding to one of the three projected lights, that is, a period of a sub-frame. If exposure times for the three projected lights are different from one another, T may be set to T1 when s=1, set to T2 when s=2, and set to T3 when s=3. The following explanation will be made assuming that the same exposure time T is set for the three projected lights.

The control unit 106 adjusts a control signal to cause average values of the three projected lights to be the same. FIGS. 2 and 4 illustrate the first through third projected lights expressed using Equation 1. In FIGS. 2 and 4, Te=25 ns, m=5, and average values of the first through third projected lights are 0.5 (W). Waveforms of the first through third projected lights may be any of various waveforms that may be expressed by using Equation 1. For example, each of the first through third projected lights may have any of waveforms including a sinusoidal waveform, a triangular waveform, a rectangular waveform, a combination thereof, and a waveform with distortion.

When parts of the projected lights expressed by using Equation 1 are reflected from the object 200 and are incident on the optical apparatus 100 again, the reflected lights may be represented as polynomial expressions such as Equation 3.

$$\begin{aligned}P_r^{(s)}(t) &= r\left[\sum_{k=1}^m \{a_k^{(s)}\sin(k\omega(t-t_{TOF})) + \right.\\ &\qquad \left. b_k^{(s)}\cos(k\omega(t-t_{TOF}))\} + \overline{P}_{ave}\right] + \overline{P}_a \\ &= r\left[\sum_{k=1}^m \{a_k^{(s)}\sin(k\omega t - k\phi_{TOF}) + \right.\\ &\qquad \left. b_k^{(s)}\cos(k\omega t - k\phi_{TOF})\} + \overline{P}_{ave}\right] + \overline{P}_a\end{aligned} \qquad \text{[Equation 3]}$$

A reflected light returns to the optical apparatus 100 after a time delay $t_{TOF}$ according to distance due to a reflectance "r" of the object 200. Here, the reflectance "r" may be defined as a ratio of the amount of light reflected from the object 200 and incident on the optical apparatus 100, and is a variable related to various factors such as a distance to the object 200, a material and a gradient of a surface of the object 200, and a size of the first lens 108. $\overline{P}_a$ is an intensity of an ambient light introduced to the optical apparatus 100 other than the projected lights. The phase delay $\Phi_{TOF}$ according to distance may be represented with a time delay TOF and a period "Te" of a driving waveform of a projected light as shown in Equation 4.

$$\phi_{TOF} = 2\pi\frac{T_{TOF}}{T_e} \qquad \text{[Equation 4]}$$

A general waveform of a gain of the light modulator 103 may be represented as a general polynomial expression such as a Fourier series, as shown in Equation 5.

$$G(t) = \sum_{k=1}^n \{c_k\sin(k\omega t) + d_k\cos(k\omega t)\} + \overline{G}_{ave} \qquad \text{[Equation 5]}$$

where coefficients $c_k$ and $d_k$ of a sine term and a cosine term may be obtained by directly measuring a waveform of a gain of the light modulator 103 and performing Fourier transformation, such as FFT, on the measured waveform. The order number "n" is sufficiently high to appropriately express a measurement value. An average value of the gain of the light modulator 103 may be defined by Equation 6.

$$\overline{G}_{ave} = \frac{1}{T}\int_0^T G(t)\,dt \qquad \text{[Equation 6]}$$

where T is a period of one sub-frame as described above. FIG. 3 illustrates the gain of the light modulator 103 expressed in Equation 5. In FIG. 3, Te=25 ns, n=5, and an average value of the gain is 0.4 (W).

2-2. Light Modulation by Using Light Modulator and Generation of Intensity Image by Using Photodetector The reflected lights expressed as Equation 3 reach the photodetector 105 by being multiplied by the gain of the light modulator 103, expressed as Equation 5. Light intensities $I^{(s)}(t)$=(s=1, 2, 3) of modulated images obtained by the light modulator 103 may be represented as polynomial expressions, such as Equation 7.

$$\begin{aligned}I^{(s)}(t) &= P_r^{(s)}(t) \times G(t) \\ &= \left[r\sum_{k=1}^m \{a_k^{(s)}\sin(k\omega t - k\phi_{TOF}) + \right.\\ &\qquad b_k^{(s)}\cos(k\omega t - k\phi_{TOF})\} + \\ &\qquad \left. (r\overline{P}_{ave} + \overline{P}_a)\right] \times \\ &\quad \left[\sum_{k=1}^m \{c_k\sin(k\omega t) + d_k\cos(k\omega t)\} + \overline{G}_{ave}\right]\end{aligned} \qquad \text{[Equation 7]}$$

The modulated images passing through the light modulator 103 are accumulated for an exposure time T in the photodetector 105 and intensity images are created from the modulated images. If distance information is extracted by using three intensity images, the exposure time T may be ⅓ of an output period of a distance information image. For example, if a distance information image is output at a frame rate "fd" of 30 frames per second (fd=30), the exposure time T may be about 0.011 seconds. According to the sensitivity of the photodetector 105, there is a predetermined conversion rate between intensities of lights input to the photodetector 105 and intensities of intensity images output from the photodetector 105. For convenience of explanation, the intensities of the intensity images may be defined by Equation 8.

$$I_{CCD}^{(s)} \equiv \frac{2}{T}\int_0^T I^{(s)}(t)\,dt \qquad \text{[Equation 8]}$$

In Equation 8, a scale factor between the intensities of the lights input to the photodetector 105 and the intensities of the intensity images output from the photodetector 105 is assumed to be 1. Accordingly, in actual calculation, it may be necessary to determine a scale factor through calibration on the photodetector 105 and apply the determined scale factor to Equation 8.

In general, a period "Te" of a projected light, for example, 25 ns, is much less than the exposure time T, for example, 0.011 s. Accordingly, a direct current (DC) term in Equation 7 mainly contributes to integration of Equation 8, whereas an alternating current (AC) term is offset between negative/positive numbers and thus rarely contributes to the integration of Equation 8. Accordingly, Equation 9 of the intensity images may be obtained by substituting Equation 7 into Equation 8 and considering only the DC term. Detailed mathematical derivation thereof will not be explained.

$$I_{CCD}^{(s)} = rF^{(s)}(\phi_{TOF}) + \overline{B} \qquad \text{[Equation 9]}$$

$$F^{(s)}(\phi_{TOF}) = \sum_{k=1}^{l}[(a_k^{(s)}c_k + b_k^{(s)}d_k)\cos(k\phi_{TOF}) + (b_k^{(s)}c_k - a_k^{(s)}d_k)\sin(k\phi_{TOF})] \qquad \text{[Equation 10]}$$

$$\overline{B} = 2(r\overline{P}_{ave} + \overline{P}_a)\overline{G}_{ave} \qquad \text{[Equation 11]}$$

In Equation 10, the order number "l" is the lower one between the order number "m" and the order number "n". $F^{(s)}(\Phi_{TOF})$ is a function of the phase delay $\Phi_{TOF}$ which is an unknown and may be expressed as Equation 10. Accordingly, as is found from Equation 9 through Equation 11, each of the intensities of the intensity images may be represented as a sum of the function $F^{(s)}(\Phi_{TOF})$ of the phase delay $\Phi_{TOF}$ and a constant term $\overline{B}$ that is not related to the phase delay $\Phi_{TOF}$.

2-3. Definition of Problem for Distance Information Extraction and Extraction Method matters to be solved: $\phi_{TOF}, r\overline{P}_a$ known parameters obtainable from measurement $a_k^{(s)}, b_k^{(s)}, \overline{P}_{ave}$: obtained by measuring optical power $c_k, d_k, \overline{G}_{ave}$: obtained by measuring a gain of the light modulator 103

$I_{CCD}^{(1)}, I_{CCD}^{(2)}, I_{CCD}^{(3)}$: detection result of the photodetector 105 [Equation 12]

Three or more equations are necessary to solve the problem. To this end, three equations may be derived from the intensities of the intensity images expressed as Equation 9. That is, the following simultaneous equations may be formed by using Equation 9 after sequentially detecting the three intensity images corresponding to the first through third projected lights by using the photodetector 105.

$$I_{CCD}^{(1)} = rF^{(1)}(\phi_{TOF}) + \overline{B} \text{ (for example, } 0 \leq t < T) \qquad \text{[Equation 13]}$$

$$I_{CCD}^{(2)} = rF^{(2)}(\phi_{TOF}) + \overline{B} \text{ (for example, } T \leq t \leq 2T) \qquad \text{[Equation 14]}$$

$$I_{CCD}^{(3)} = rF^{(3)}(\phi_{TOF}) + \overline{B} \text{ (for example, } 2T \leq t < 3T) \qquad \text{[Equation 15]}$$

Accordingly, the TOF phase delay $\Phi_{TOF}$, the reflectance "r", and the intensity $\overline{P}_a$ of the ambient light, which are three unknowns, may be extracted by using the simultaneous equations Equation 13 through Equation 15.

Since the simultaneous equations Equation 13 through Equation 15 are nonlinear functions of unknowns, large amounts of computation resources are required to directly extract the unknowns through numerical analysis. In order to extract a distance information image in real time, a method of extracting an accurate result in a relatively short time is required. Accordingly, a method of creating a lookup table by using a vector space is suggested to reduce the simultaneous equations Equation 13 through Equation 15.

To this end, the lookup table may be created by defining a vector in a 3D space such as Equation 16 and Equation 17.

$$\vec{I}_{CCD} = [I_{CCD}^{(12)}, I_{CCD}^{(23)}, I_{CCD}^{(31)}]^T \qquad \text{[Equation 16]}$$

$$\vec{F}(\phi_{TOF}) = [F^{(12)}(\phi_{TOF}), F^{(23)}(\phi_{TOF}), F^{(31)}(\phi_{TOF})]^T \qquad \text{[Equation 17]}$$

$$I_{CCD}^{(ij)} = I_{CCD}^{(i)} - I_{CCD}^{(j)}, (i,j)=1, 2, 3 \qquad \text{[Equation 18]}$$

$$F^{(ij)}(\phi_{TOF}) = F^{(i)}(\phi_{TOF}) - F^{(j)}(\phi_{TOF}), (i,j)=1, 2, 3 \qquad \text{[Equation 19]}$$

Figure 8:
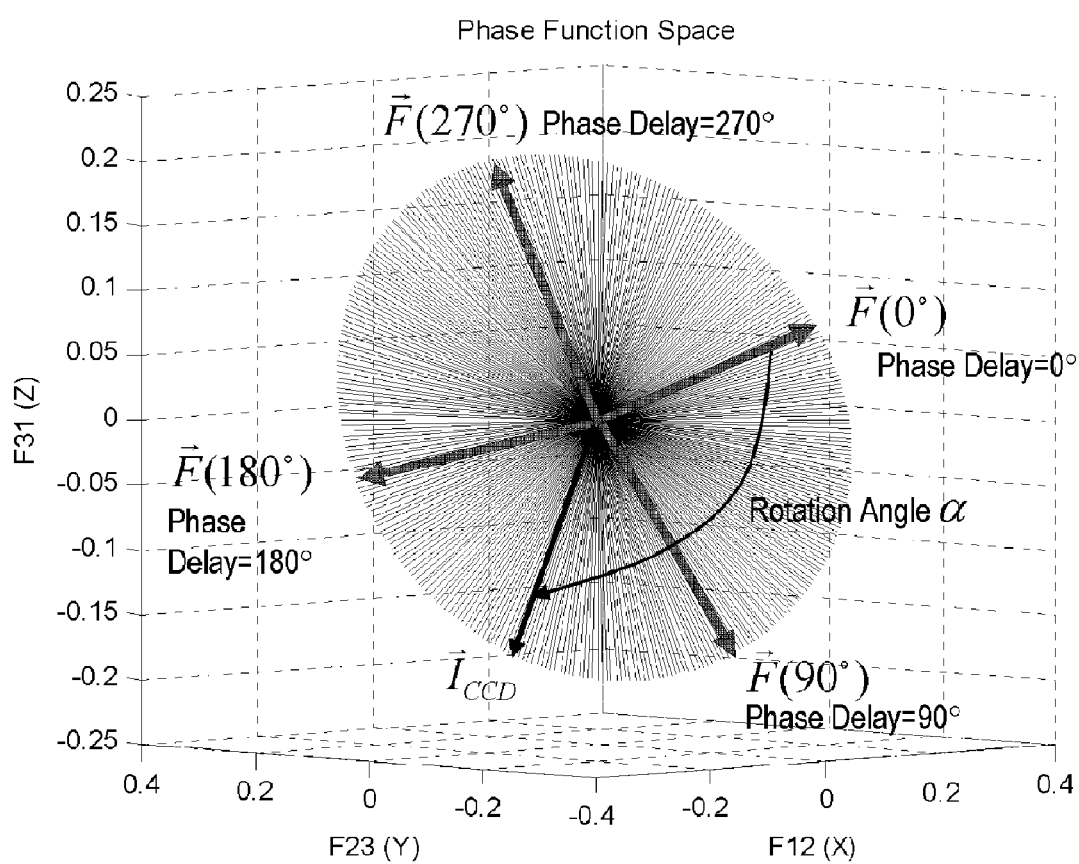
FIG. 8 illustrates that a vector of an intensity image and a vector function having a phase delay as a variable are represented in a three-dimensional (3D) space in order to create a lookup table.

As is found from Equation 16 and Equation 18, a vector in a 3D space with respect to an intensity image may be quantized as a combination of differences of the intensities of the intensity images respectively corresponding to the three projected lights. Likewise, as is found from Equation 17 and Equation 19, a vector function in a 3D space, with respect to a phase delay, may be quantized as a combination of differences between functions of phase delays respectively corresponding to the three projected lights. It is also possible to use a combination of ratios of differences, instead of a combination of differences. FIG. 8 illustrates that a vector function $\vec{F}(\phi_{TOF})$ of a phase delay and an intensity image vector $\vec{I}_{CCD}$ with respect to an intensity image are expressed in a 3D space.

The vector function $\vec{F}(\phi_{TOF})$ which is mathematically known, has the phase delay ΦTOF as a variable. The intensity image vector $\vec{I}_{CCD}$ is determined through measurement. The vector defined by Equation 16 through Equation 19 is a rank-2 vector, and forms a disk with a normal vector (1,1,1) as shown in FIG. 8. Accordingly, a rotation angle α of the intensity image vector $\vec{I}_{CCD}$ rotated from a reference vector, for example, $\vec{F}(0°)$, has a one-to-one correspondence with the phase delay ΦTOF. Accordingly, the rotation angle α and the phase delay ΦTOF corresponding to the rotation angle α may be previously calculated, and a relationship between the rotation angle α and the phase delay ΦTOF may be represented as a lookup table function LUT(α), such as Equation 20 or a table.

$$\phi_{TOF} = LUT(\alpha) \qquad \text{[Equation 20]}$$

Figure 9:
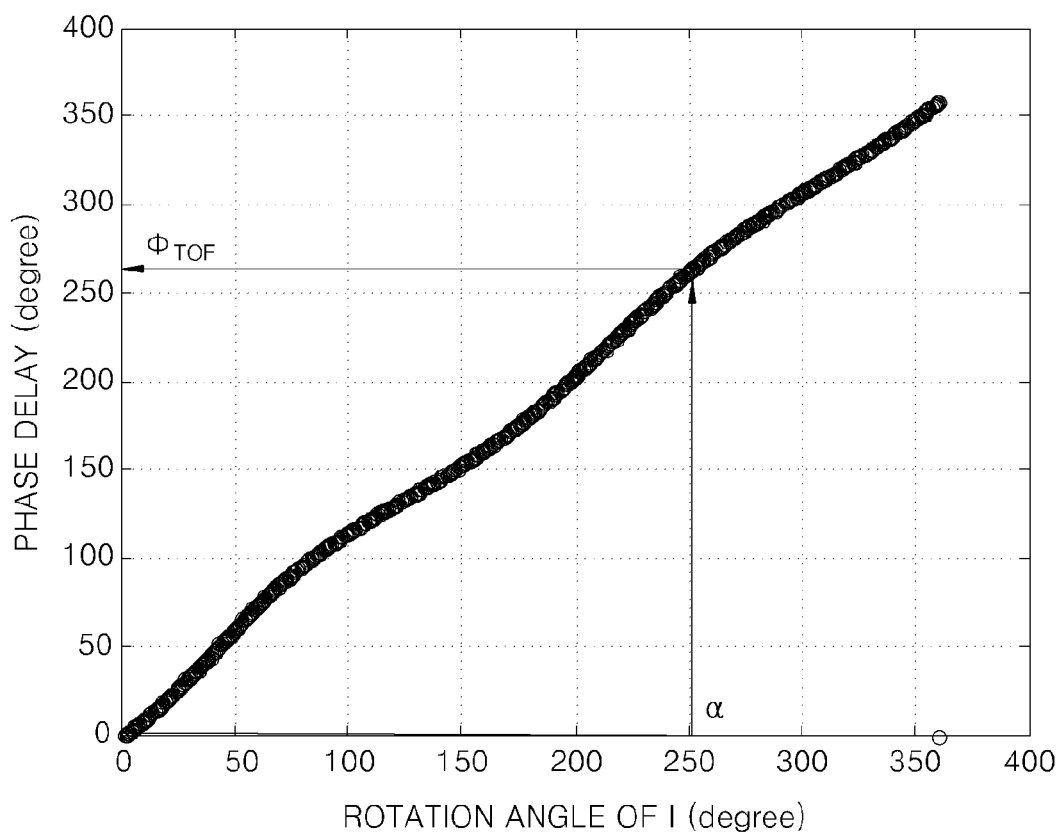
FIG. 9 is a graph illustrating a lookup table.

FIG. 9 is a graph illustrating a lookup table. A table representing the one-to-one correspondence between the rotation angle α and the phase delay $\Phi_{TOF}$ is displayed as the graph in FIG. 9. As is found from FIG. 9, if the intensity image vector $\vec{I}_{CCD}$ is obtained through measurement by using the photodetector 105, the rotation angle α of the intensity image vector $\vec{I}_{CCD}$ rotated from the reference vector may be obtained. Then, the phase delay $\Phi_{TOF}$ may be obtained by referring to the lookup table by using the rotation angle α.

If the constant term $\overline{B}$ is eliminated from the equations Equation 13 through Equation 15, the following conditions for a solution may be obtained. Detailed mathematical derivation thereof will not be explained.

$$r = \frac{I^{(12)}_{CCD}}{F^{(12)}(\phi_{TOF})} = \frac{I^{(23)}_{CCD}}{F^{(23)}(\phi_{TOF})} = \frac{I^{(31)}_{CCD}}{F^{(31)}(\phi_{TOF})} \quad \text{[Equation 21]}$$

Equation 21 is a condition for enabling two vectors defined in Equation 16 and Equation 17 to be parallel to each other in a 3D space, as shown in Equation 22.

$$\vec{F}(\phi_{TOF}) \| \vec{I}_{CCD} \quad \text{[Equation 22]}$$

That is, a condition with respect to the phase delay $\Phi_{TOF}$ that is the unknown is that the vector function $\vec{F}(\phi_{TOF})$, which is obtained by analysis, and the intensity image vector $\vec{I}_{CCD}$, which is obtained by measurement, have the same rotation angle α rotated from the reference vector on the disk in the 3D space illustrated in FIG. 8. Accordingly, the phase delay $\Phi_{TOF}$ corresponding to the rotation angle α of the intensity image vector $\vec{I}_{CCD}$ rotated from the reference vector becomes a solution. The solution is obtained by calculating the rotation angle α and then reading the phase delay $\Phi_{TOF}$ from the lookup table. The rotation angle α may be calculated in various ways. For example, a rotation angle α rotated from a reference vector $\vec{F}(0°)$ may be calculated as shown in Equation 23.

$$\alpha = \tan^{-1}\left(\frac{\vec{y}^T \vec{I}_{CCD}}{\vec{x}^T \vec{I}_{CCD}}\right) \quad \text{[Equation 23]}$$

$$\vec{x} = \vec{F}(0°)/\|\vec{F}(0°)\| \quad \text{[Equation 24]}$$

$$\vec{y} = \vec{Y}/\|\vec{Y}\| \quad \vec{Y} = \vec{F}(90°) - (\vec{F}(90°)^T \vec{x})\vec{x} \quad \text{[Equation 25]}$$

The phase delay $\Phi_{TOF}$ is obtained by using the rotation angle α calculated in Equation 23 and the lookup table that is previously calculated. In FIG. 9, the phase delay $\Phi_{TOF}$ when α=250° is 270°. A distance "d", that is, a depth, between the object 200 and the optical apparatus 100 for each pixel of the photodetector 105, may be obtained by using the phase delay as shown in Equation 26.

$$d = \frac{\phi_{TOF} c T_e}{4\pi} \quad \text{[Equation 26]}$$

where "c" is the velocity of light.

The reflectance "r" may be obtained from Equation 21 as follows.

$$r = \frac{I^{(12)}_{CCD}}{F^{(12)}(\phi_{TOF})} \quad \text{[Equation 27]}$$

The intensity $\overline{P}_a$ of the ambient light may be obtained from Equation 11 and Equation 13 as follows.

$$\overline{P}_a = \frac{I^{(12)}_{CCD} - rF^{(1)}(\phi_{TOF})}{2\overline{G}_{ave}} - r\overline{P}_{ave} \quad \text{[Equation 28]}$$

Although it is assumed in Equation 8 that the scale factor between the intensities of the lights input to the photodetector 105 and the intensities of the intensity images output from the photodetector 105 is 1, scaling occurs at a specific ratio. Accordingly, although the reflectance "r" and the intensity $\overline{P}_a$ of the ambient light need to be obtained by scaling results of Equation 27 and Equation 28 at the specific ratio, such scaling has not been used because it is assumed that a scale factor is 1 for convenience.

3. Flowchart

Figure 10:
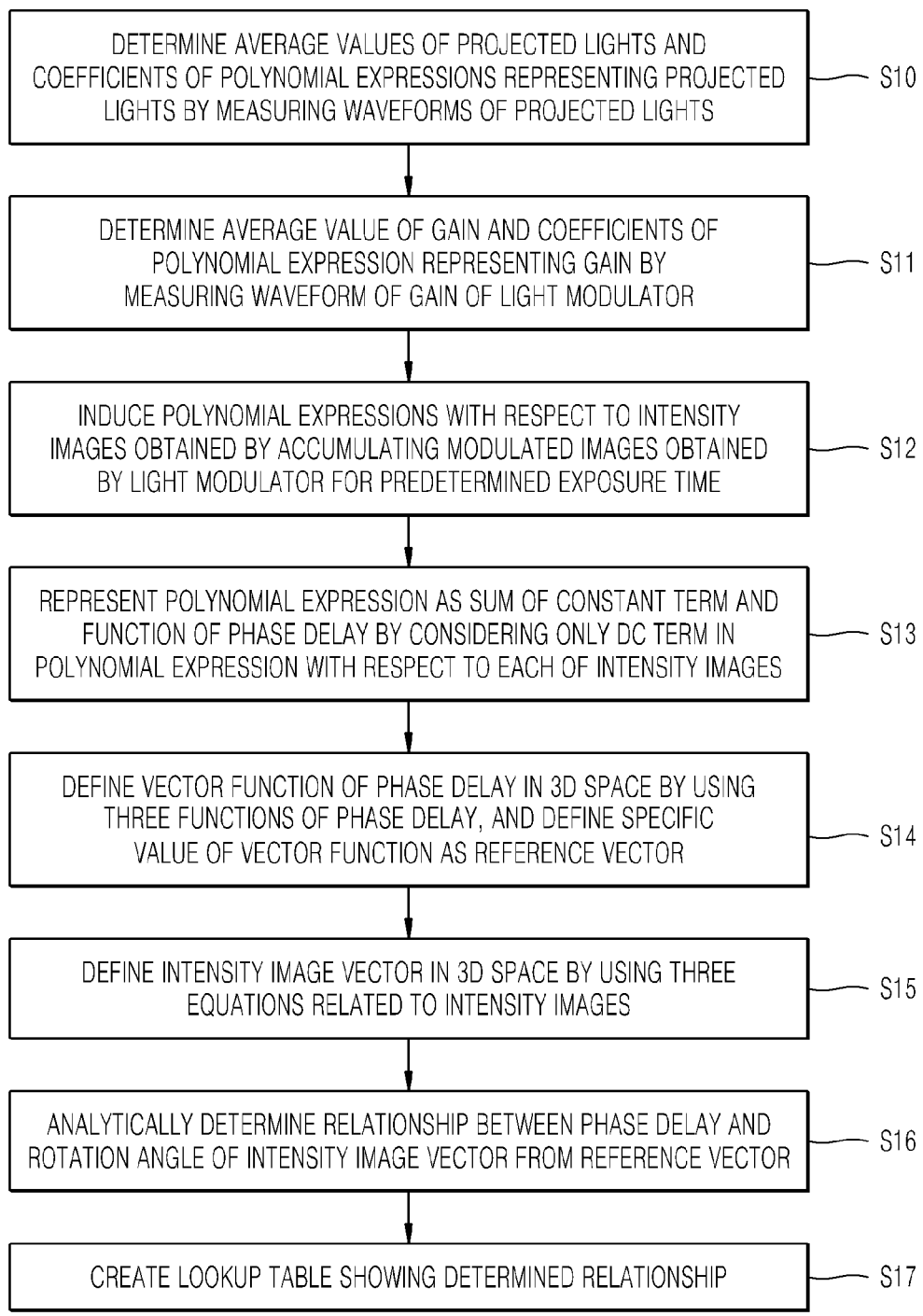
FIG. 10 is a flowchart illustrating a method of creating a lookup table, according to an exemplary embodiment.

FIG. 10 is a flowchart illustrating a method of creating a lookup table in the aforesaid distance information extraction algorithm, according to an exemplary embodiment. Referring to FIG. 10, in operation S10, waveforms of at least three different projected lights to be emitted from the light source 101 are measured. Coefficients of a general polynomial expression representing a projected light, such as Equation 1, may be determined from the measured waveforms of the at least three projected lights. For example, a coefficient $a_k^{(s)}$ of a sine term of the $k^{th}$ order in a projected light (s) and a coefficient $b_k^{(s)}$ of a cosine term of the $k^{th}$ order in the projected light (s) in Equation 1 may be determined. If three projected lights are used, coefficients of the three projected lights may be sequentially determined through measurement. Average values $\overline{P}_{ave}$ of the three projected lights are also determined. As described above, the average values of the three projected lights may be controlled to be the same.

In operation S11, a waveform of a gain of the light modulator 103 is measured. Coefficients of a general polynomial expression representing a gain, such as Equation 5, may be determined from the measured waveform of the gain of the light modulator 103. For example, coefficients $c_k$ and $d_k$ of a sine term and a cosine term in Equation 5 may be determined through the measurement. An average value $\overline{G}_{ave}$ of the gain may also be determined. If one projected light and three different gains are used instead of three different projected lights and one gain, coefficients of polynomial expressions may be determined by measuring waveforms of all of the three different gains. The following explanation will be made on a case where three different projected lights and one gain are used, for convenience.

In operation S12, a general polynomial expression with respect to each of the reflected lights of the three projected lights reflected from the object 200 is Equation 3. Intensities $I^{(s)}(t)$ (s=1, 2, 3) of modulated images obtained by the light modulator may be obtained as shown in Equation 7 from Equation 3. That is, Equation 7 may be obtained by multiplying Equation 3, related to the reflected lights, by Equation 5 related to the waveform of the gain. Next, if Equation 7, related to the modulated images, is integrated with an exposure time T at the photodetector 105, as shown in Equation 8, polynomial expressions with respect to intensity images (or intensities of the intensity images) obtained by accumulating the modulated images obtained by the light modulator 103 for the exposure time T by using the photodetector 105 may be induced. Here, since three intensity images respectively corresponding to the three projected lights are obtained, three polynomial expressions for the three intensity images are induced.

In operation S13, as described above, since only a DC term present in Equation 7 mainly contributes to integration and an AC term rarely contributes to the integration, polynomial expressions of Equation 7 and Equation 8, with respect to the intensities of the intensity images, may be formed by considering only the DC term. Then, each of the polynomial expressions with respect to the intensities of the intensity images may be represented as a sum of a function $F^{(s)}(\Phi_{TOF})$ (see Equation 10) of a phase delay $\Phi_{TOF}$ that is an unknown and a constant term $\overline{B}$ (see Equation 11) that is not related to the phase delay $\Phi_{TOF}$, as shown in Equation 9. The constant term $\overline{B}$ is composed of average values of the three projected lights, an average value of the waveform of the gain, and an intensity of an ambient light other than the projected lights/reflected lights, as shown in Equation 11.

One polynomial expression with respect to an intensity of an intensity image and one function of a phase delay exist for each of the three projected lights as expressed in Equation 9 and Equation 10. In operation S14, as expressed in Equation 17 and Equation 19, a vector function $\vec{F}(\phi_{TOF})$ of a phase delay in a 3D space may be defined by using a combination of differences between three functions $F^{(1)}(\Phi_{TOF})$, $F^{(2)}(\Phi_{TOF})$, and $F^{(3)}(\Phi_{TOF})$ of the phase delay. As described above, the vector function $\vec{F}(\phi_{TOF})$ may form a disk with a normal vector (1,1,1) (see FIG. 8). In order to set coordinate references in the 3D space, a vector of a specific value may be defined as a reference vector. For example, if a vector $\vec{F}(0°)$ having a phase delay $\Phi_{TOF}=0$ in the vector function of the phase delay is set as an x-axis, the reference vector may be defined as shown in Equation 24 and Equation 25.

In operation S15, an intensity image vector $\vec{T}_{CCD}$ may be defined in the 3D space as a combination of differences of the intensities of the intensity images respectively corresponding to the three projected lights, as expressed in Equation 16 and Equation 17, by using Equations 13 through Equation 15 related to the intensities of the intensity images. As described above, the intensity image vector, which is determined through measurement, may form a disk with a normal vector (1,1,1) in the 3D space like the vector function $\vec{F}(\phi_{TOF})$ of the phase delay $\Phi_{TOF}$. A rotation angle α of the intensity image vector from the reference vector has a one-to-one correspondence with the phase delay $\Phi_{TOF}$. Accordingly, in operation S16, a relationship between the rotation angle α of the intensity image vector from the reference vector and the phase delay $\Phi_{TOF}$ corresponding to the rotation angle α may be previously calculated and determined through numerical analysis or the like. In operation S17, a lookup table showing the previously determined the relationship, as shown in Equation 20, may be created in the form of a table or a function.

The lookup table created as described above is obtained from a result of previously measuring a combination of the three specific projected lights and the gain. If a phase or a waveform of any one of the three projected lights and the gain is changed, a new lookup table may be created. For example, different lookup tables may be created for various combinations of projected lights and gains to be used in the optical apparatus 100. During operation of the optical apparatus 100, a lookup table corresponding to a specific combination of used projected lights and gains may be referenced. Examples of the various combinations of the projected lights and the gains may include a combination of three projects and one gain, a combination of four or more projected lights and one gain, and a combination of one projected light and three or more gains. In any case, the aforesaid method of creating a lookup table may be used. For example, the lookup table may be loaded into the distance information image processor 107 illustrated in FIG. 1, which may be a microprocessor, CPU, or the like, or may be stored in a separate computer-readable storage medium, such as a random access memory (RAM), read-only memory (ROM), or the like (not shown).

Figure 11:
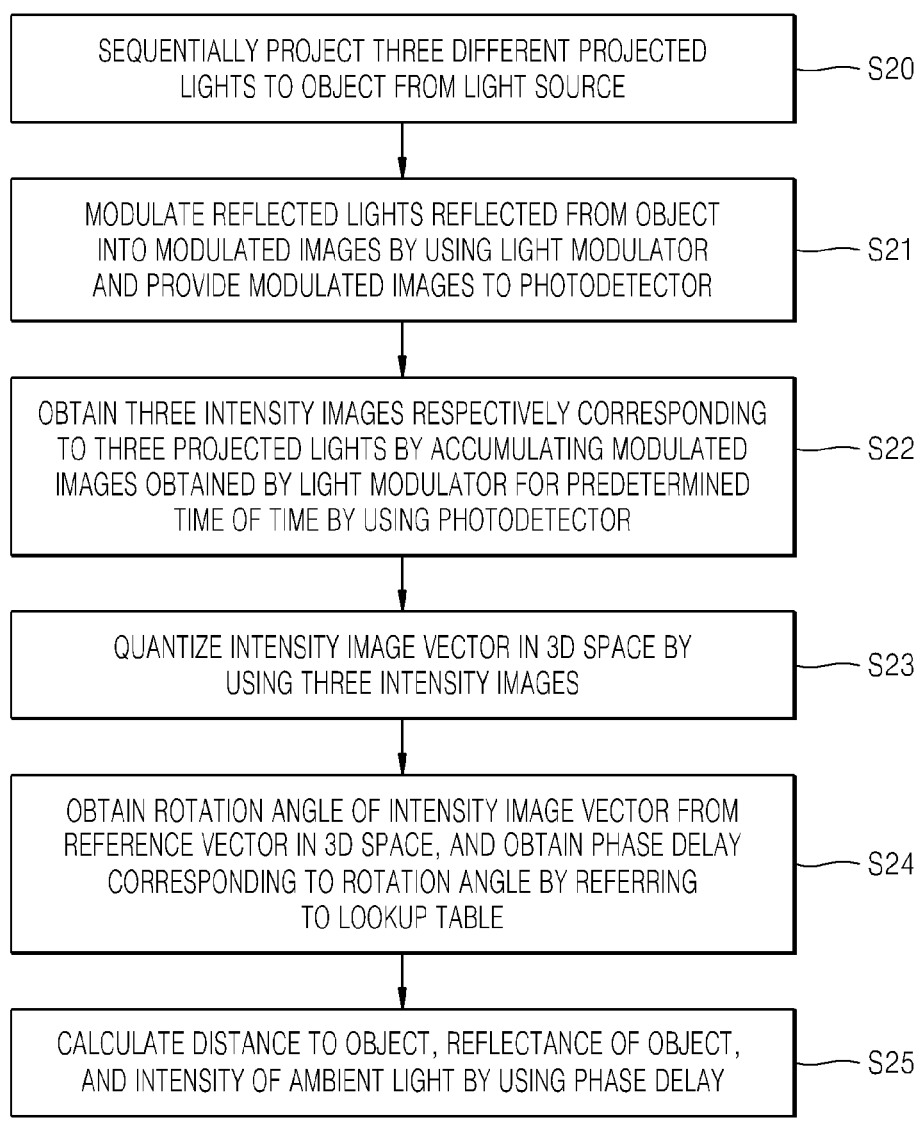
FIG. 11 is a flowchart illustrating a method of extracting distance information by using the lookup table of FIG. 10, according to an exemplary embodiment.

FIG. 11 is a flowchart illustrating a method of extracting distance information by using the lookup table obtained by the process of FIG. 10, according to an exemplary embodiment. Although other combinations of projected lights and gains are possible, the following explanation will be made on a case where three different projected lights and one gain are used, for convenience.

In operation S20, the light source 101 sequentially generates three different projected lights and projects the three different projected lights onto the object 200. As described above, the three projected lights have the same period and different phases, or may have different waveforms. For example, the three projected lights may be lights having NIR wavelengths of about 850 nm.

Parts of the three projected lights are reflected from the object 200 and sequentially return as three reflected lights to the optical apparatus 100. Only NIR lights of about 850 nm, from among the three reflected lights, are transmitted through the filter 109. In operation S21, the three reflected lights reflected from the object 200 are modulated by the light modulator 103 into modulated images each having a predetermined waveform, and the modulated images are provided to the photodetector 105. A waveform of a gain of the light modulator 103 may be any one as long as a period of the waveform of the gain of the light modulator is equal to that of the three projected lights.

In operation S22, the photodetector 105 accumulates the modulated images obtained by the light modulator 103 for a predetermined exposure time T and outputs three intensity images respectively corresponding to the three projected lights. The three intensity images may be provided to the distance information image processor 107. In operation S23, the distance information image processor 107 may quantize an intensity image vector in a 3D space, as described with reference to Equation 16 and Equation 18, by using intensities of the three intensity images.

In operation S24, the distance information image processor 107 obtains a rotation angle α of the intensity image vector rotated from a reference vector in the 3D space, by using Equation 23. As described above, the reference vector is previously defined from Equation 24 and Equation 25. The distance information image processor 107 may obtain a phase delay corresponding to the rotation angle α by referring to a lookup table that is previously stored. Different lookup tables may be provided according to various combinations of usable projected lights and gains. Accordingly, the distance information image processor 107 may refer to a lookup table corresponding to a specific combination of the projected lights and the gain respectively used in the light source 101 and the light modulator 103.

In operation S25, the distance information image processor 107 may calculate a distance to the object 200, a reflectance of the object 200, and an intensity of an ambient light by using the phase delay calculated above. For example, the distance to the object 200, the reflectance of the object 200, and the intensity of the ambient light may be calculated by substituting the phase delay into Equation 26 through Equation 28.

Although a method of extracting distance information for one pixel of the photodetector 105 has been described, the same method applies for all other pixels of the photodetector 105. The aforesaid method may be applied to a photodetector including a plurality of pixels that are arranged in a 1D array or a photodetector including only one photodiode, as well as the photodetector 105 including a plurality of pixels that are arranged in a 2D array, such as a CCD.

As to the amount of computation necessary to perform the methods of FIGS. 10 and 11, most of the calculations are carried out in the method of creating the lookup table of FIG. 10. However, the lookup table may be previously calculated and created by a manufacturer of the optical apparatus 100. Accordingly, calculations carried out in real time to extract distance information include a calculation for quantizing an intensity image vector, as illustrated in FIG. 11, a calculation for obtaining a phase delay by referring to the lookup table, and a calculation for extracting information about a distance to the object 200, a reflectance of the object 200, and an intensity of an ambient light from the phase delay. In this regard, since the amount of computation performed by the optical apparatus 100 is relatively small, the optical apparatus 100 may be able to extract distance information in real time. Accordingly, the optical apparatus 100 may be applied to a 3D camera for simultaneously acquiring both image information about an image having a plurality of pixels and distance information for each pixel in the image.

4. Experiment Result

A simulation was performed in order to verify the method of extracting the distance information of FIG. 11. Lights having three waveforms (marked by a solid line) were projected with a period of 25 ns, as illustrated in FIG. 2, and a gain was a gain having a waveform (marked by a solid line) with a period of 25 ns, as illustrated in FIG. 3. A distance to an object which ranges from about 0.5 m to about 3.5 m was measured in such a manner as described in the method of FIG. 11. Random noise, which had an intensity of about 0.1% of an intensity of an intensity image, was intentionally applied to the intensity image in order to consider noise of a photodetector, e.g., a CCD.

Figure 12:
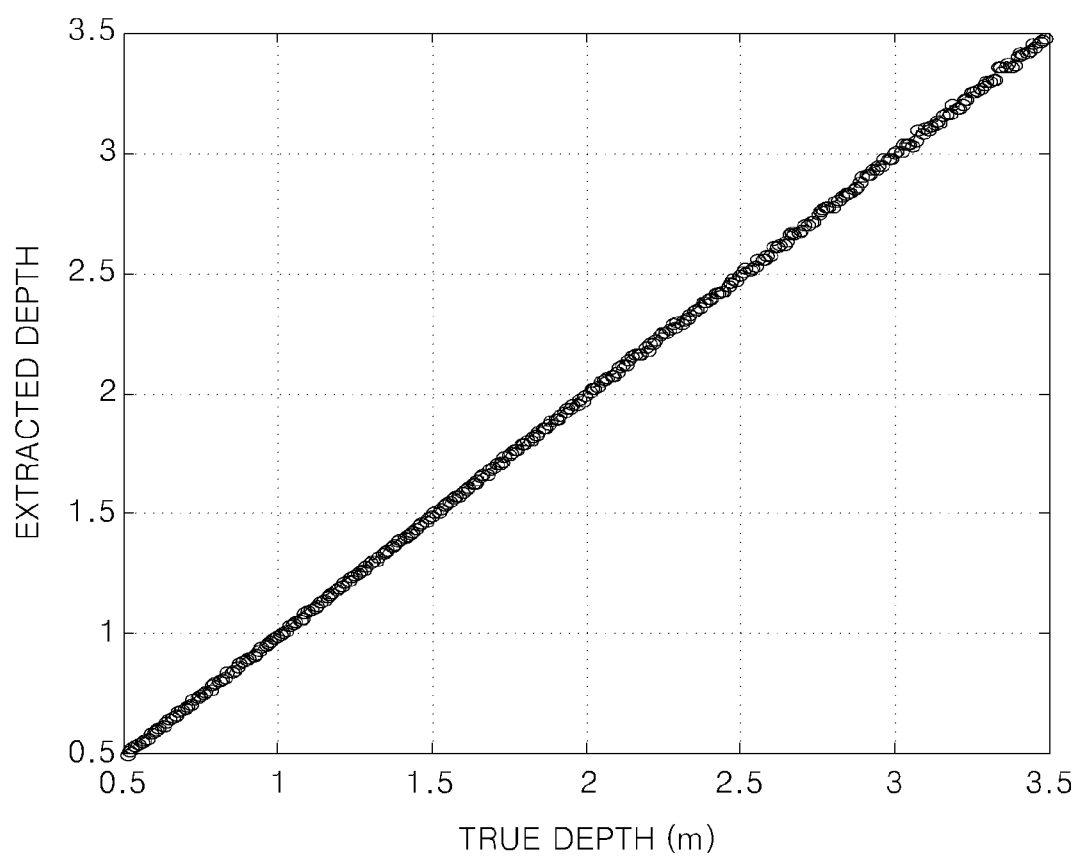
FIG. 12 is a graph illustrating a relationship between true distance information and extracted distance information obtained by a simulation.
Figure 13:
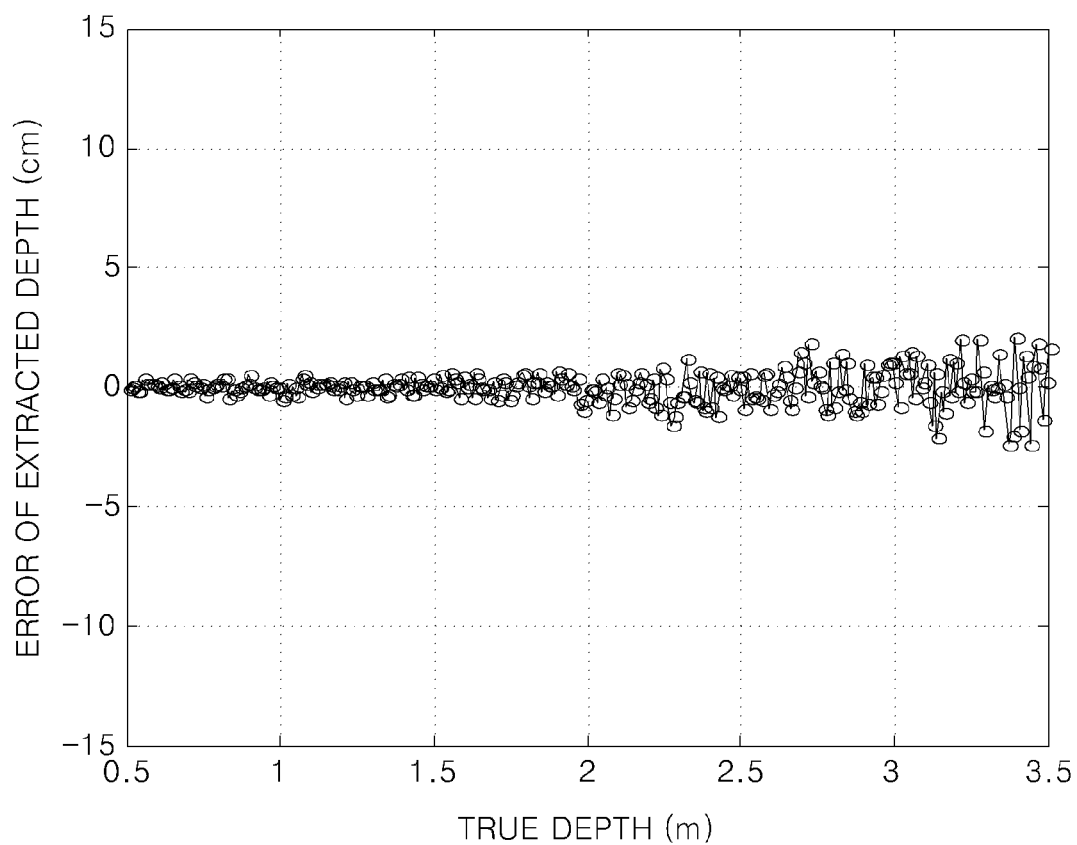
FIG. 13 is a graph illustrating an error between the true distance information and the extracted distance information of FIG. 12.

FIG. 12 is a graph illustrating a relationship between true distance information and extracted distance information obtained by the simulation. FIG. 13 is a graph illustrating an error between the true distance information and the extracted distance information of FIG. 12. Referring to FIGS. 12 and 13, an error of about 2 cm occurs in a distance of about 3 m. This is because of the noise intentionally applied to the photodetector. Since an intensity of a reflected light decreases as a distance increases to reduce a signal-to-noise ratio, the error may increase as the distance increases. The error of about 2 cm in the distance of 3 m, however, is regarded as an error usable by a common distance information camera.

Figure 14:
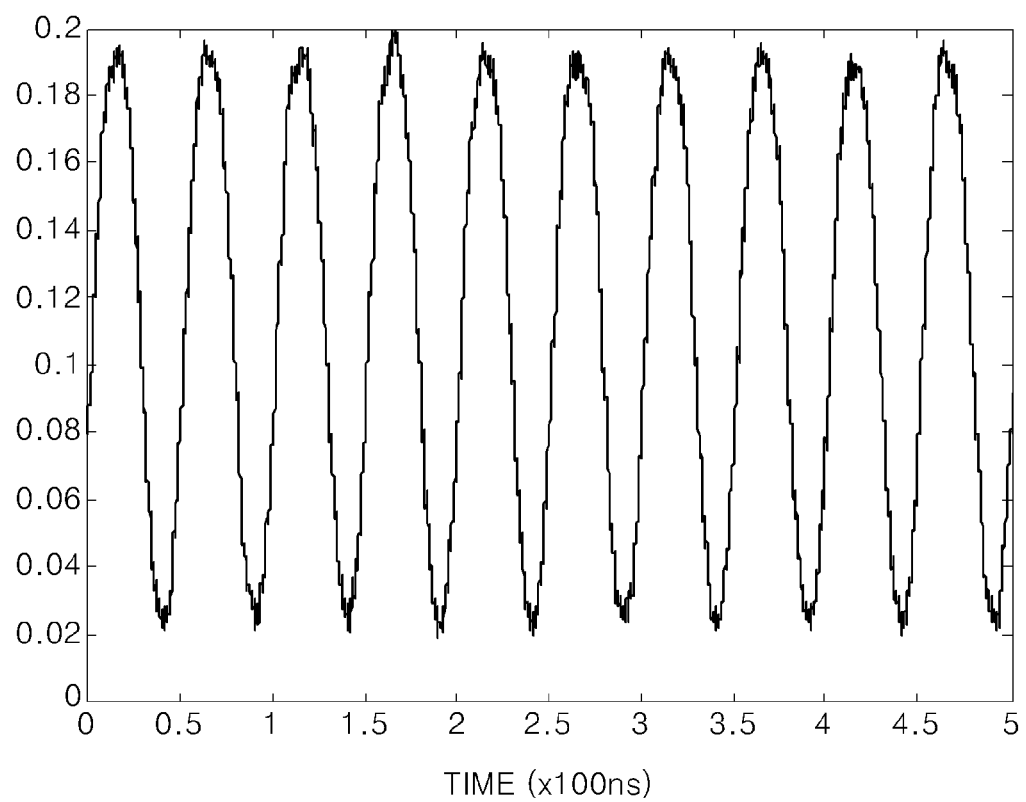
FIG. 14 is a graph illustrating optical power of a laser diode (LD) measured for an experiment.
Figure 15:
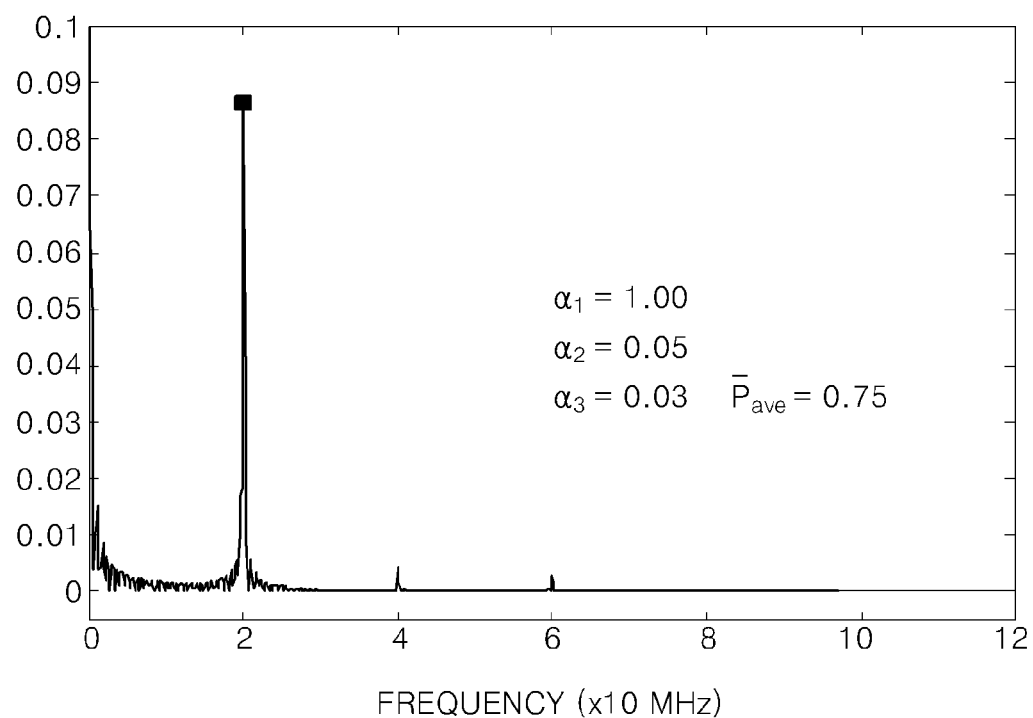
FIG. 15 is a graph illustrating a result of analyzing a spectrum of the optical power of the LD of FIG. 14 by using fast Fourier transformation (FFT)
Figure 16:
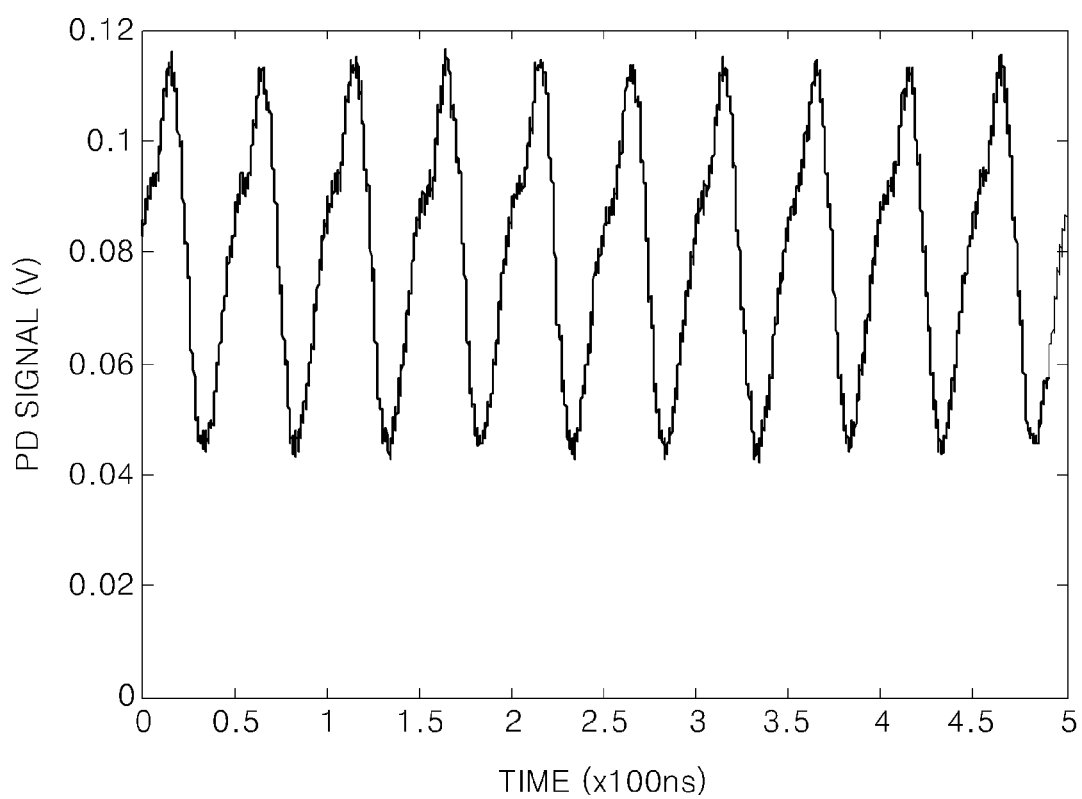
FIG. 16 is a graph illustrating a gain of a light modulator.
Figure 17:
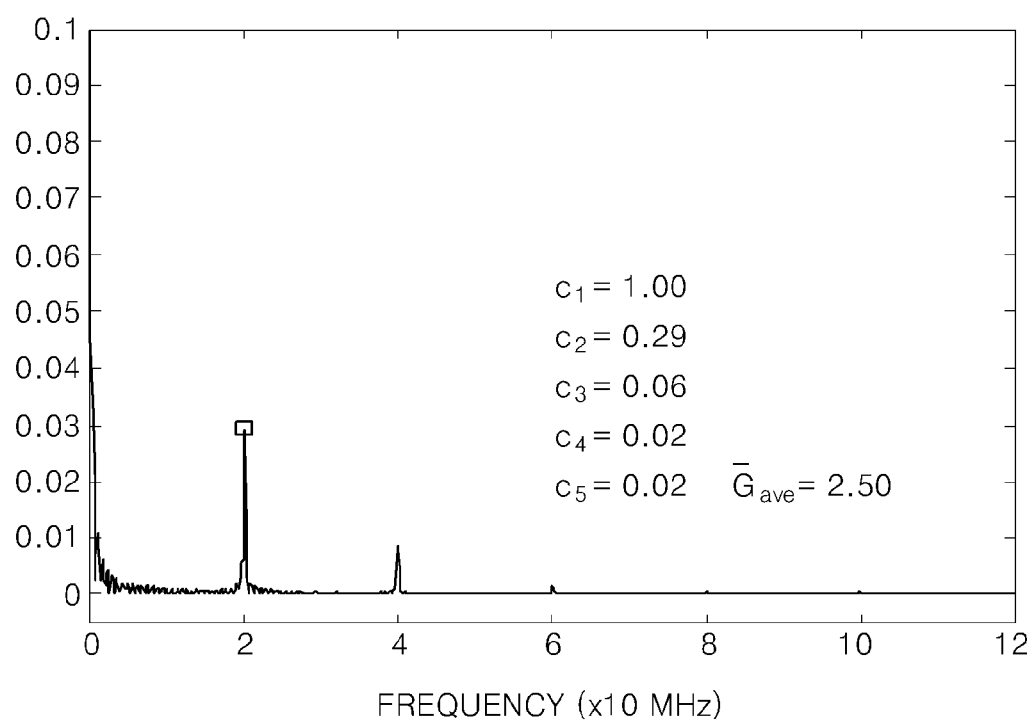
FIG. 17 is a graph illustrating a result of analyzing a spectrum of the gain of FIG. 16 by using FFT.

Hardware for implementing the aforesaid distance information extraction algorithm was manufactured and an experiment was performed. In this experiment, distances of 20 cm to 180 cm were measured at 20 cm intervals by driving an LD and a light modulator at about 20 MHz. FIG. 14 is a graph illustrating optical power of the LD. FIG. 15 is a graph illustrating a result of analyzing a spectrum of the optical power of the LD of FIG. 14 by using FFT. Referring to FIG. 15, it is found that a term of a high order besides the basic frequency of 20 MHz is present in the optical power of the LD. The term of the high order was applied to the distance information extraction algorithm. FIG. 16 is a graph illustrating a gain of the light modulator. In FIG. 16, DC-offset and lots of waveform distortion are observed. FIG. 17 is a graph illustrating a result of analyzing a spectrum of the gain of FIG. 16 by using FFT. Referring to FIG. 17, it is found many terms of high orders, besides the basic frequency of 20 MHz, are present in the gain of the light modulator. The terms of high orders were applied to the distance information extraction algorithm.

Figure 18:
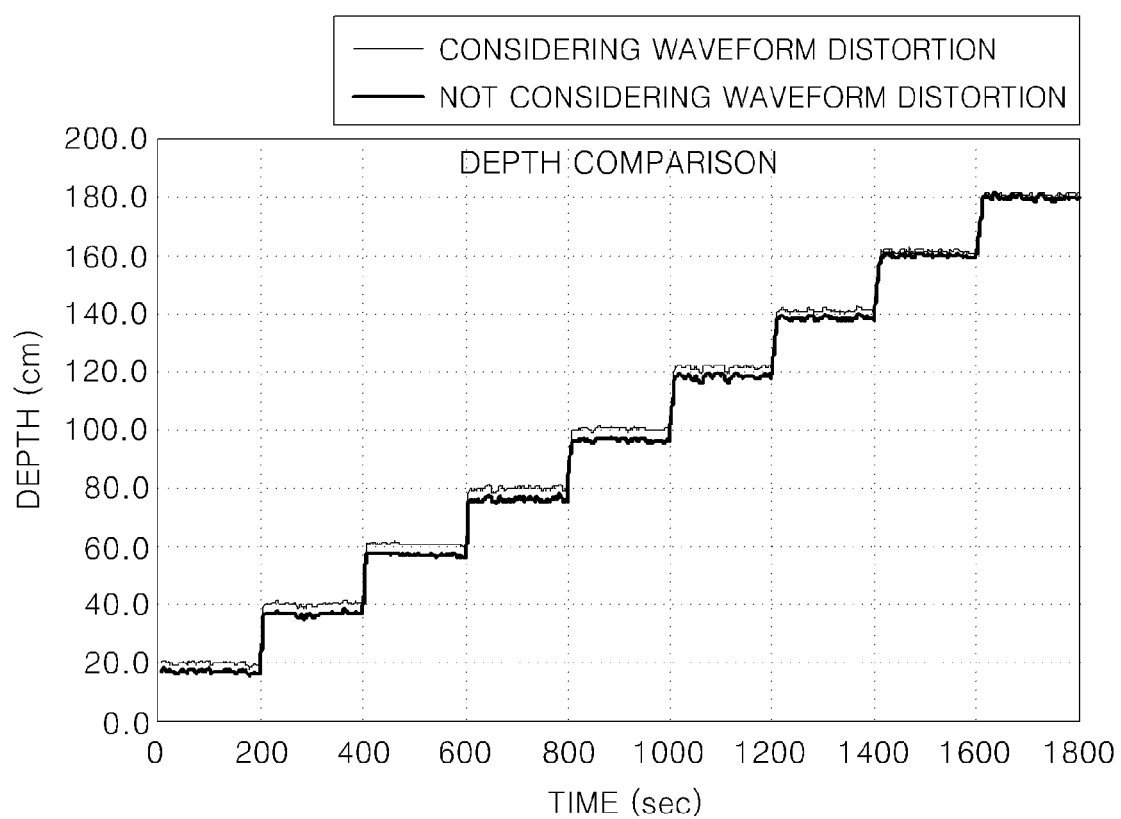
FIG. 18 is a graph illustrating distance information that does not consider waveform distortion and distance information that considers waveform distortion according to a distance information extraction algorithm.

FIG. 18 is a graph illustrating distance information that does not consider waveform distortion and distance information that considers waveform distortion, according to the distance information extraction algorithm. In FIG. 18, a solid line indicates the distance information that considers the waveform information and a dashed line indicates the distance information that does not consider the waveform information. Referring to FIG. 18, while the distance information that considers the waveform distortion had an average error of about 0.7 cm, the distance information that does not consider the waveform distortion had an average error of about 2.1 cm.

As described above, since the distance information extraction algorithm extracts distance information by considering a measured nonlinear waveform, and not a mathematically ideal waveform, accurate distance information may be extracted without being affected by a used waveform. Accordingly, an expensive light source or an expensive light modulation device for generating a light having little distortion and nonlinearity is not required and a complex error correction unit is not required. Furthermore, since a general light source, a general light modulation device, and a general optical apparatus may be able to be used, additional costs do not arise. Moreover, since a lookup table in which previously calculated distance information is stored is used, the amount of computation to extract distance information is very small, thereby permitting real time capture of distance information. Accordingly, the optical apparatus 100 using the distance information extraction algorithm may be applied to a 3D camera or a laser radar (LADAR).

The exemplary embodiments may be written as computer programs and can be implemented by processors in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

While the exemplary embodiments have been particularly shown and described, the exemplary embodiments used to explain the present invention should not be construed as limiting the scope of the present invention defined by the claims. The preferred embodiments should be considered in a descriptive sense only and not for purposes of limitation. Therefore, the scope of the invention is defined, not by the detailed description of the invention, but by the appended claims, and all differences within the scope will be construed as being included in the present invention.

What is claimed is:

1. A method of extracting distance information, the method comprising:

projecting a plurality of different lights onto an object;

modulating, by a light modulator having a gain, reflected lights reflected from the object into modulated images;

detecting, by a photodetector, the modulated images and obtaining from the modulated images a plurality of intensity images respectively corresponding to the plurality of different lights;

obtaining a phase delay of each of the reflected lights from the plurality of intensity images; and calculating a distance to the object from the obtained phase delay, wherein the obtaining of the phase delay comprises referring to a lookup table that stores information obtained by measuring the waveforms of the plurality of different lights and the gain of the light modulator, wherein the lookup table associates the phase delay, the waveforms of the lights projected onto the object, and the gain of the light modulator with each other.

2. The method of claim 1, wherein the waveforms of the plurality of different lights and the gain of the light modulator have the same period.

3. The method of claim 2, wherein the plurality of different lights have one of the same waveform and different phases or different waveforms.

4. The method of claim 2, wherein the plurality of different lights are controlled to have the same average value.

5. The method of claim 1, wherein the photodetector forms the plurality of intensity images respectively corresponding to the plurality of different lights by accumulating a plurality of modulated images, which respectively correspond to the plurality of different lights, respectively for predetermined exposure times.

6. The method of claim 1, further comprising obtaining a reflectance of the object and an intensity of an ambient light from the phase delay.

7. The method of claim 1, wherein the obtaining of the phase delay comprises:
quantizing an intensity image vector in a three-dimensional (3D) space by using the plurality of intensity images;
obtaining a rotation angle of the intensity image vector from a reference vector in the 3D space; and
obtaining from the rotation angle a phase delay of each of the reflected lights by referring to the lookup table.

8. The method of claim 7, wherein the lookup table comprises a previously determined relationship between the phase delay of each of the reflected lights and the rotation angle.

9. The method of claim 7, wherein the intensity image vector is quantized as a combination of differences between the plurality of intensity images.

10. The method of claim 1, wherein the lookup table comprises plural different lookup tables corresponding to various combinations of the plurality of different lights and the gain, and
wherein the obtaining comprises referring to a lookup table among the plural lookup tables corresponding to a specific combination of the plurality of different lights and the gain.

11. The method of claim 1, further comprising creating the lookup table, wherein creating comprises:
obtaining polynomial expressions representing the gain and the plurality of different lights by measuring waveforms of the plurality of different lights and the gain of the light modulator;
obtaining polynomial expressions with respect to the plurality of intensity images by using the polynomial expressions with respect to the waveforms of the plurality of different lights and the gain of the light modulator;
representing each of the polynomial expressions with respect to the plurality of intensity images as a sum of a function of the phase delay and a constant term that is not related to the phase delay;
defining a vector function of the phase delay in a three-dimensional (3D) space by using a combination of differences between a plurality of functions of the phase delay, and defining a specific vector as a reference vector;
defining an intensity image vector in the 3D space as a combination. Of differences between the polynomial expressions with respect to the plurality of intensity images;
determining a relationship between a rotation angle of the intensity image vector from the reference vector and a phase delay corresponding to the rotation angle; and
creating the lookup table including the determined relationship.

12. The method of claim 11, wherein the obtaining the polynomial expressions comprises:
inducing general polynomial expressions with respect to the reflected lights from the polynomial expressions with respect to the plurality of different lights;
obtaining polynomial expressions with respect to the modulated images by multiplying the polynomial expressions with respect to the reflected lights by the polynomial expression with respect to the gain; and
obtaining polynomial expressions with respect to the plurality of intensity images respectively corresponding to the plurality of different lights by integrating the polynomial expressions with respect to the modulated images with an exposure time of the photodetector.

13. The method of claim 11, wherein the obtaining the polynomial expressions representing the gain and the plurality of different lights by measuring the waveforms of the plurality of different lights and the gain of the light modulator comprises:
measuring the waveform of each of the plurality of different lights; expressing a result of the measuring of the waveform of each of the plurality of different lights as an orthogonal function on a time axis;
measuring the waveform of the gain of the light modulator; and
expressing a result of the measuring of the waveform of the gain of the light modulator as an orthogonal function on the time axis.

14. The method of claim 13, wherein the expressing of the result of the measuring of the waveform of each of the plurality of different lights as the orthogonal function on the time axis comprises obtaining a polynomial expression with respect to each of the plurality of different lights by determining coefficients of sine terms and coefficients of cosine terms of a Fourier series or coefficients of a Chebyshev polynomial expression.

15. The method of claim 13, wherein the expressing of the result of the measuring of the waveform of the gain of the light modulator as the orthogonal function on the time axis comprises obtaining a polynomial expression with respect to the gain by determining coefficients of sine terms and coefficients of cosine terms of a Fourier series or coefficients of a Chebyshev polynomial expression.

16. The method of claim 13, further comprising determining average values of the plurality of different lights and an average value of the gain from the results of the measuring of the waveform of each of the plurality of different lights and the waveform of the gain.

17. The method of claim 11, wherein the representing comprises representing each of the polynomial expressions with respect to the plurality of intensity images as the sum of the function of the phase delay and the constant term that is not related to the phase delay by considering only a direct current (DC) term present in each of the polynomial expressions with respect to the plurality of intensity images.

18. The method of claim 11, wherein the vector function of the phase delay in the 3D space is defined by
[right arrow over (F)]$(\phi_{TOF})$= [$F^{(12)}(\phi_{TOF}), F^{(23)}(\phi_{TOF}), F^{(31)}(\phi_{TOF})$]$^T$ where
$F^{(ij)}(\phi_{TOF}) = F^{(i)}(\phi_{TOF}) - F^{(j)}(\phi_{TO-F})$, i,j=1, 2, 3, and $F^{(i)}(\Phi_{TOF})$ is a function of a phase delay of an i$^{th}$ projected light.

19. The method of claim 18, wherein a vector $\vec{F}(0°)$ having a phase delay $\Phi_{TOF}=0$ in the vector function of the phase delay is defined as a reference vector.

20. The method of claim 11, wherein the intensity image vector in the 3D space is defined by [right arrow over (I)].sub.CCD=[I.sub.CCD.sup.(12), I.sub.CCD.sup.(23), I.sub.CCD.sup.(31)].sup.T where I.sub.CCD.sup.(ij)= I.sub.CCD.sup.(i)-I.sub.CCD.sup.(j), i,j=1, 2, 3, and I.sup.(i).sub.CCD is an intensity image corresponding to an i.sup.th projected light.

21. The method of claim 11, wherein different lookup tables are created according to various combinations of the plurality of different lights and the gain.

22. A method of extracting distance information, the method comprising:
projecting light having a periodic waveform onto an object;
modulating, by a light modulator having a plurality of different gains, a light reflected from the object into modulated images;
detecting, by a photodetector, the modulated images to obtain a plurality of intensity images respectively corresponding to the plurality of different gains;
obtaining a phase delay of the reflected light by using the plurality of intensity images; and
calculating a distance to the object from the obtained phase delay,
wherein the obtaining of the phase delay comprises obtaining the phase delay by referring to a lookup table having information obtained by measuring waveforms of the projected light and the plurality of different gains of the light modulator,
wherein the lookup table associates the phase delay, the waveforms of the lights projected onto the object, and the gain of the light modulator with each other.

23. The method of claim 22, wherein the waveform of the projected light and the plurality of different gains have the same period.

24. The method of claim 22, wherein the photodetector forms the plurality of intensity images respectively corresponding to the plurality of different gains by accumulating the plurality of modulated images, which respectively correspond to the plurality of different gains, respectively for predetermined exposure times.

25. The method of claim 22, wherein the obtaining of the phase delay comprises:
quantizing an intensity image vector in a three-dimensional (3D) space by using the plurality of intensity images;
obtaining a rotation angle of the intensity image vector from a reference vector in the 3D space; and
obtaining, from the rotation angle, a phase delay of the reflected light by referring to the lookup table.

26. The method of claim 25, wherein the lookup table comprises a previously determined relationship between the phase delay of the reflected light and the rotation angle.

27. The method of claim 25, wherein the intensity image vector is quantized as a combination of differences between the plurality of intensity images.

28. The method of claim 22, wherein the lookup table comprises plural different lookup tables corresponding to various combinations of the plurality of different gains and the projected light, and
wherein the obtaining comprises referring to a lookup table among the plural lookup tables corresponding to a specific combination of the plurality of different gains and the projected light.

29. An optical apparatus that determines a distance between the optical apparatus and an object, the optical apparatus comprising:
a light source that generates a plurality of different lights and projects the plurality of different lights onto the object, each of the plurality of different lights having a periodic waveform;
a light modulator having a gain that modulates reflected lights reflected from the object into modulated images, each of the modulated images having a periodic waveform;
a photodetector that detects the modulated images obtained by the light modulator and obtains, from the modulated images, a plurality of intensity images respectively corresponding to the plurality of different lights; and
a distance information image processor obtains a phase delay of each of the reflected lights from the plurality of intensity images, and calculates the distance between the optical apparatus and the object by referring to a lookup table that stores information obtained by measuring the waveforms of the plurality of different lights and the gain of the light modulator,
wherein the lookup table associates the phase delay, the waveforms of the lights projected onto the object, and the gain of the light modulator with each other.

30. The optical apparatus of claim 29, further comprising:
a light source driving unit that controls waveforms of the plurality of different lights by driving the light source;
a light modulator driving unit that controls a waveform of a gain by driving the light modulator; and
a control unit that controls operations of the light source driving unit, the light modulator driving unit, and the photodetector.

31. The optical apparatus of claim 29, further comprising:
a first lens, disposed near a light incident surface of the light modulator, that focuses the reflected lights within an area of the light modulator;
a filter, disposed between the first lens and the light modulator, that transmits only lights having specific wavelengths; and
a second lens, disposed between the light modulator and the photodetector, that focuses the modulated images obtained by the light modulator within an area of the photodetector.

32. The optical apparatus of claim 29, wherein the photodetector comprises a charge-coupled diode (CCD) image sensor or a complementary metal-oxide semiconductor (CMOS) image sensor including a two-dimensional (2D) or one-dimensional (1D) array, a photodetector comprising an array of photodiodes, or a photodetector comprising one photodiode for measuring a distance to a single point.

33. A 3D camera comprising the optical apparatus of claim 29.

34. A laser radar comprising the optical apparatus of claim 29.

35. A method of creating a lookup table for calculating distance information between an optical apparatus and an object, the method comprising:
measuring waveforms of a plurality of different lights projected onto the object and a gain of a light modulator;
obtaining polynomial expressions representing the plurality of different lights and the gain of a light modulator from the measured waveforms and the gain;
obtaining polynomial expressions with respect to a plurality of intensity images from the polynomial expressions with respect to the waveforms of the plurality of different lights and the gain of the light modulator;

representing each of the polynomial expressions with respect to the plurality of intensity images as a sum of a function of a phase delay and a constant term that is not related to the phase delay;

defining a vector function of the phase delay in a three-dimensional (3D) space from a combination of differences between a plurality of functions of the phase delay, and defining a specific vector as a reference vector;

defining an intensity image vector in the 3D space as a combination of differences between the polynomial expressions with respect to the plurality of intensity images;

determining a relationship between a rotation angle of the intensity image vector from the reference vector and a phase delay corresponding to the rotation angle; and expressing the determined relationship in the form of a table or a function.

36. A method of creating a lookup table for calculating distance information between an optical apparatus and an object, the method comprising:

measuring waveforms light projected onto the object and a plurality of different gains of a light modulator;

obtaining polynomial expressions representing the light and the plurality of different gains of the light modulator from the measured light and the plurality of different gains;

obtaining polynomial expressions with respect to a plurality of intensity images from the polynomial expressions with respect to the light and the plurality of different gains of the light modulator;

quantizing each of polynomial expressions with respect to the plurality of intensity images as a sum of a function of a phase delay and a constant term that is not related to the phase delay;

defining a vector function of the phase delay in a three-dimensional (3D) space from a combination of differences of a plurality of functions of the phase delay, and defining a specific vector as a reference vector;

defining an intensity image vector in the 3D space as a combination of differences between the polynomial expressions with respect to the plurality of intensity images;

determining a relationship between a rotation angle of the intensity image vector from the reference vector and a phase delay corresponding to the rotation angle; and expressing the determined relationship in the form of a table or a function.

37. A non-transitory computer-readable storage medium storing the lookup table created by the method of claim 35.

38. A non-transitory computer-readable storage medium storing the lookup table created by the method of claim 36.

39. A non-transitory method of calculating a distance between an optical apparatus and an object, the method comprising:

projecting light onto the object, the light having a waveform;

modulating, by a light modulator of the optical apparatus, the light modulator having a gain, light reflected from the object into modulated images;

obtaining, from the modulated images, an intensity image corresponding to the light projected onto the object;

obtaining, from the intensity image, a phase delay of the light reflected from the object; and calculating, by a processor of the optical apparatus, the distance between the optical apparatus and the object from the phase delay, the waveform of the light projected onto the object, and the gain of the light modulator, wherein the calculating comprises calculating the distance by referring to a lookup table that associates the phase delay, the waveform of the light projected onto the object, and he gain of the light modulator with each other.

* * * * *